(12) United States Patent
McCusker et al.

(10) Patent No.: US 7,675,461 B1
(45) Date of Patent: Mar. 9, 2010

(54) SYSTEM AND METHOD FOR DISPLAYING RADAR-ESTIMATED TERRAIN

(75) Inventors: Patrick Dennis McCusker, Walker, IA (US); Richard Marcel Rademaker, Rijswijk (NL); Richard D. Jinkins, Rewey, WI (US); Joel Michael Wichgers, Urbana, IA (US); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/901,505

(22) Filed: Sep. 18, 2007

(51) Int. Cl.
| G01S 7/04 | (2006.01) |
| G01S 7/40 | (2006.01) |
| G01S 13/89 | (2006.01) |
| G01S 7/00 | (2006.01) |
| G01S 13/00 | (2006.01) |
| G01S 13/93 | (2006.01) |

(52) U.S. Cl. .......................... 342/179; 342/29; 342/118; 342/120; 342/123; 342/165; 342/173; 342/175; 342/176; 342/195; 701/1; 701/3; 701/300; 701/301; 340/945; 340/963; 340/971

(58) Field of Classification Search ............. 342/27–51, 342/61–65, 118–123, 175–186, 195, 25 R–25 F, 342/165–174, 190, 191; 701/1, 3, 300, 301; 340/945, 963–980, 983
See application file for complete search history.

(56) References Cited

U.S. PATENT DOCUMENTS

| 4,888,599 | A | | 12/1989 | Harwood et al. |
| 5,838,262 | A | * | 11/1998 | Kershner et al. ............ 340/945 |
| 6,008,756 | A | | 12/1999 | Boerhave et al. |
| 6,016,121 | A | | 1/2000 | Bogensberger et al. |
| 6,023,240 | A | | 2/2000 | Sutton |
| 6,044,324 | A | | 3/2000 | Boerhave et al. |
| 6,064,922 | A | | 5/2000 | Lee |
| 6,064,942 | A | | 5/2000 | Johnson et al. |
| 6,085,129 | A | | 7/2000 | Schardt et al. |
| 6,085,150 | A | | 7/2000 | Henry et al. |
| 6,107,943 | A | | 8/2000 | Schroeder |
| 6,111,701 | A | | 8/2000 | Brown |
| 6,121,899 | A | | 9/2000 | Theriault |
| 6,128,553 | A | | 10/2000 | Gordon et al. |
| 6,140,772 | A | | 10/2000 | Bishop |
| 6,150,901 | A | | 11/2000 | Auken |
| 6,154,151 | A | | 11/2000 | McElreath et al. |
| 6,157,891 | A | * | 12/2000 | Lin ............................ 701/301 |

(Continued)

OTHER PUBLICATIONS

U.S. Appl. No. 11/807,594, filed May 29, 2007, Woodell et al.

(Continued)

*Primary Examiner*—Bernarr E Gregory
(74) *Attorney, Agent, or Firm*—Matthew J. Evans; Daniel M. Barbieri

(57) ABSTRACT

A circuit for a display used on an aircraft causes the display to display a composite terrain image. The composite terrain image can be formed from first terrain data from a terrain database and second terrain data from a radar system. A display control circuit can generate a display signal for the composite terrain image. The display signal is received by the display. The composite terrain image can be viewed by a pilot.

20 Claims, 20 Drawing Sheets

U.S. PATENT DOCUMENTS

| | | | |
|---|---|---|---|
| 6,163,021 A | 12/2000 | Mickelson | |
| 6,166,661 A | 12/2000 | Anderson et al. | |
| 6,169,770 B1 | 1/2001 | Henely | |
| 6,175,314 B1 | 1/2001 | Cobley | |
| 6,178,391 B1 | 1/2001 | Anderson et al. | |
| 6,191,839 B1 | 2/2001 | Briley et al. | |
| 6,194,980 B1 | 2/2001 | Thon | |
| 6,201,494 B1 | 3/2001 | Kronfeld | |
| 6,205,376 B1 | 3/2001 | Gordon | |
| 6,216,267 B1 | 4/2001 | Mitchell | |
| 6,236,511 B1 | 5/2001 | Brown | |
| 6,239,745 B1 | 5/2001 | Stratton | |
| 6,259,400 B1 | 7/2001 | Higgins et al. | |
| 6,266,114 B1 | 7/2001 | Skarohlid | |
| 6,266,582 B1 | 7/2001 | Bruckner | |
| 6,272,572 B1 | 8/2001 | Backhaus et al. | |
| 6,281,832 B1 | 8/2001 | McElreath | |
| 6,285,298 B1 | 9/2001 | Gordon | |
| 6,285,313 B1 | 9/2001 | Wahab et al. | |
| 6,285,337 B1 | 9/2001 | West et al. | |
| 6,285,926 B1 | 9/2001 | Weiler et al. | |
| 6,297,810 B1 | 10/2001 | Anderson | |
| 6,298,286 B1 | 10/2001 | Ying | |
| 6,308,116 B1 | 10/2001 | Ricks et al. | |
| 6,313,759 B1 | 11/2001 | Musland-Sipper | |
| 6,317,872 B1 | 11/2001 | Gee et al. | |
| 6,320,634 B1 | 11/2001 | Winker et al. | |
| 6,335,694 B1 | 1/2002 | Beksa et al. | |
| 6,336,728 B1 | 1/2002 | Deloy | |
| 6,343,863 B1 | 2/2002 | Wood | |
| 6,345,127 B1 | 2/2002 | Mitchell | |
| 6,353,425 B1 | 3/2002 | Mosier | |
| 6,359,669 B1 | 3/2002 | Dehmlow | |
| 6,362,797 B1 | 3/2002 | Dehmlow | |
| 6,366,350 B1 | 4/2002 | Thornburg et al. | |
| 6,366,836 B1 | 4/2002 | Johnson | |
| 6,373,216 B1 | 4/2002 | Ho | |
| 6,373,478 B1 | 4/2002 | Steffensmeier | |
| 6,373,536 B1 | 4/2002 | Mell et al. | |
| 6,374,286 B1 | 4/2002 | Gee et al. | |
| 6,377,892 B1 | 4/2002 | Johnson et al. | |
| 6,388,607 B1 | 5/2002 | Woodell | |
| 6,388,608 B1 | 5/2002 | Woodell et al. | |
| 6,388,611 B1 | 5/2002 | Dillman | |
| 6,388,724 B1 | 5/2002 | Campbell et al. | |
| 6,388,821 B1 | 5/2002 | Dehmlow | |
| 6,390,920 B1 | 5/2002 | Infiesto et al. | |
| 6,392,358 B1 | 5/2002 | Runau et al. | |
| 6,401,013 B1 | 6/2002 | McElreath | |
| 6,419,372 B1 | 7/2002 | Shaw et al. | |
| 6,424,288 B1 | 7/2002 | Woodell | |
| 6,426,717 B1 | 7/2002 | Maloratsky | |
| 6,441,773 B1 | 8/2002 | Kelly et al. | |
| 6,445,573 B1 | 9/2002 | Portman et al. | |
| 6,448,787 B1 | 9/2002 | Oglesby | |
| 6,448,922 B1 | 9/2002 | Kelly | |
| 6,449,556 B1 | 9/2002 | Pauly | |
| 6,452,155 B1 | 9/2002 | Sherlock et al. | |
| 6,452,330 B1 | 9/2002 | Steffensmeier | |
| 6,452,511 B1 | 9/2002 | Kelly et al. | |
| 6,453,259 B1 | 9/2002 | Infiesto | |
| 6,453,267 B1 | 9/2002 | Rudzik et al. | |
| 6,456,236 B1 | 9/2002 | Hauck et al. | |
| 6,457,837 B1 | 10/2002 | Steffensmeier | |
| 6,466,235 B1 | 10/2002 | Smith et al. | |
| 6,473,240 B1 | 10/2002 | Dehmlow | |
| 6,477,163 B1 | 11/2002 | Miller | |
| 6,480,789 B2 * | 11/2002 | Lin | 701/301 |
| 6,487,526 B1 | 11/2002 | Mitchell | |
| 6,489,916 B2 * | 12/2002 | Block | 342/65 |
| 6,492,934 B1 | 12/2002 | Hwang et al. | |
| 6,494,587 B1 | 12/2002 | Shaw et al. | |
| 6,497,486 B1 | 12/2002 | Robertson | |
| 6,499,027 B1 | 12/2002 | Weinberger | |
| 6,512,476 B1 | 1/2003 | Woodell | |
| 6,512,527 B1 | 1/2003 | Barber et al. | |
| 6,513,937 B1 | 2/2003 | Dehmlow | |
| 6,515,624 B1 | 2/2003 | Roesler et al. | |
| 6,521,879 B1 | 2/2003 | Rand et al. | |
| 6,525,674 B1 | 2/2003 | Kelly et al. | |
| 6,529,706 B1 | 3/2003 | Mitchell | |
| 6,531,669 B1 | 3/2003 | Miller et al. | |
| 6,535,266 B1 | 3/2003 | Nemeth et al. | |
| 6,540,363 B1 | 4/2003 | Steffensmeier | |
| 6,549,161 B1 | 4/2003 | Woodell | |
| 6,552,735 B1 | 4/2003 | Behmlow | |
| 6,552,789 B1 | 4/2003 | Modro | |
| 6,561,600 B1 | 5/2003 | Seeley et al. | |
| 6,567,014 B1 | 5/2003 | Hansen et al. | |
| 6,567,395 B1 | 5/2003 | Miller | |
| 6,567,728 B1 | 5/2003 | Kelly et al. | |
| 6,571,166 B1 | 5/2003 | Johnson et al. | |
| 6,571,171 B1 | 5/2003 | Pauly | |
| RE38,142 E | 6/2003 | Berry et al. | |
| 6,573,914 B1 | 6/2003 | Pauly et al. | |
| 6,574,020 B1 | 6/2003 | Ovens | |
| 6,574,030 B1 | 6/2003 | Mosier | |
| 6,577,947 B1 | 6/2003 | Kronfeld et al. | |
| 6,590,560 B1 | 7/2003 | Lucas | |
| 6,598,227 B1 | 7/2003 | Berry et al. | |
| 6,603,425 B1 | 8/2003 | Woodell | |
| 6,604,683 B1 | 8/2003 | Jones | |
| 6,608,614 B1 | 8/2003 | Johnson | |
| 6,614,126 B1 | 9/2003 | Mitchell | |
| 6,633,286 B1 | 10/2003 | Do et al. | |
| 6,639,349 B1 | 10/2003 | Bahadur | |
| 6,639,522 B2 | 10/2003 | Derderian | |
| 6,650,275 B1 | 11/2003 | Kelly et al. | |
| 6,666,896 B1 | 12/2003 | Peng | |
| 6,686,851 B1 | 2/2004 | Gordon et al. | |
| 6,687,316 B1 | 2/2004 | McGraw | |
| 6,690,298 B1 | 2/2004 | Barber et al. | |
| 6,690,299 B1 | 2/2004 | Suiter | |
| 6,693,653 B1 | 2/2004 | Pauly | |
| 6,694,249 B1 | 2/2004 | Anderson et al. | |
| 6,700,555 B1 | 3/2004 | Jones | |
| 6,714,186 B1 | 3/2004 | Mosier et al. | |
| 6,727,468 B1 | 4/2004 | Nemeth | |
| 6,741,203 B1 | 5/2004 | Woodell | |
| 6,741,208 B1 | 5/2004 | West et al. | |
| 6,741,841 B1 | 5/2004 | Mitchell | |
| 6,744,382 B1 | 6/2004 | Lapis et al. | |
| 6,744,408 B1 | 6/2004 | Stockmaster | |
| 6,757,624 B1 | 6/2004 | Hwang et al. | |
| 6,771,626 B1 | 8/2004 | Golubiewski et al. | |
| 6,782,392 B1 | 8/2004 | Weinberger et al. | |
| 6,789,921 B1 | 9/2004 | Deloy et al. | |
| 6,799,095 B1 | 9/2004 | Owen et al. | |
| 6,801,362 B1 | 10/2004 | Brown | |
| 6,804,614 B1 | 10/2004 | McGraw et al. | |
| 6,806,846 B1 | 10/2004 | West | |
| 6,807,148 B1 | 10/2004 | Eicher | |
| 6,807,538 B1 | 10/2004 | Weinberger et al. | |
| 6,812,992 B2 | 11/2004 | Nemeth | |
| 6,813,777 B1 | 11/2004 | Weinberger et al. | |
| 6,819,365 B1 | 11/2004 | Peng | |
| 6,819,983 B1 | 11/2004 | McGraw | |
| 6,822,617 B1 | 11/2004 | Mather et al. | |
| 6,832,152 B1 | 12/2004 | Bull et al. | |
| 6,839,017 B1 | 1/2005 | Dillman | |
| 6,842,204 B1 | 1/2005 | Johnson | |
| 6,843,591 B1 | 1/2005 | Peng et al. | |
| 6,850,185 B1 | 2/2005 | Woodell | |
| 6,871,124 B1 | 3/2005 | McElreath | |

| | | |
|---|---|---|
| 6,876,906 B1 | 4/2005 | Zellers et al. |
| 6,879,280 B1 | 4/2005 | Bull et al. |
| 6,880,147 B1 | 4/2005 | Pauly |
| 6,882,302 B1 | 4/2005 | Woodell et al. |
| 6,918,134 B1 | 7/2005 | Sherlock et al. |
| 6,933,534 B1 | 8/2005 | Steffensmeier |
| 6,937,194 B1 | 8/2005 | Meier et al. |
| 6,937,377 B1 | 8/2005 | Brown et al. |
| 6,938,258 B1 | 8/2005 | Weinberger et al. |
| 6,944,032 B1 | 9/2005 | Steffensmeier et al. |
| 6,950,062 B1 | 9/2005 | Mather et al. |
| 6,961,445 B1 | 11/2005 | Jensen et al. |
| 6,970,151 B1 | 11/2005 | Mosier |
| 6,972,727 B1 | 12/2005 | West et al. |
| 6,972,788 B1 | 12/2005 | Robertson et al. |
| 6,977,608 B1 | 12/2005 | Anderson et al. |
| 6,980,182 B1 | 12/2005 | Nimmer et al. |
| 6,987,787 B1 | 1/2006 | Mick |
| 6,995,726 B1 | 2/2006 | West et al. |
| 6,995,823 B1 | 2/2006 | Kelly et al. |
| 6,997,301 B1 | 2/2006 | Seeley et al. |
| 6,998,908 B1 | 2/2006 | Sternowski |
| 6,999,022 B1 | 2/2006 | Vesel et al. |
| 7,002,546 B1 | 2/2006 | Stuppl et al. |
| 7,002,947 B1 | 2/2006 | McFarland et al. |
| 7,002,994 B1 | 2/2006 | Haendel |
| 7,009,601 B1 | 3/2006 | Sherlock et al. |
| 7,026,956 B1 | 4/2006 | Wenger et al. |
| 7,028,304 B1 | 4/2006 | Weinberger et al. |
| 7,034,753 B1 | 4/2006 | Elsallal et al. |
| 7,036,946 B1 | 5/2006 | Mosier |
| 7,053,796 B1 | 5/2006 | Barber |
| 7,069,120 B1 | 6/2006 | Koenck et al. |
| 7,089,092 B1 | 8/2006 | Wood et al. |
| 7,091,927 B1 | 8/2006 | Hagge et al. |
| 7,092,645 B1 | 8/2006 | Sternowski |
| 7,095,562 B1 | 8/2006 | Peng et al. |
| 7,098,913 B1 | 8/2006 | Etherington et al. |
| RE39,303 E | 9/2006 | Sklar et al. |
| 7,109,912 B1 | 9/2006 | Paramore et al. |
| 7,109,913 B1 | 9/2006 | Paramore et al. |
| 7,119,956 B1 | 10/2006 | Sliney, Jr. |
| 7,129,885 B1 | 10/2006 | Woodell et al. |
| 7,138,619 B1 | 11/2006 | Ferrante et al. |
| 7,148,816 B1 | 12/2006 | Carrico |
| 7,148,935 B1 | 12/2006 | Ho et al. |
| 7,151,507 B1 | 12/2006 | Herting |
| 7,158,072 B1 | 1/2007 | Venkatachalam et al. |
| 7,161,525 B1 | 1/2007 | Finley et al. |
| 7,167,308 B1 | 1/2007 | Krishnamurthy et al. |
| 7,170,446 B1 | 1/2007 | West et al. |
| 7,191,406 B1 | 3/2007 | Barber et al. |
| 7,196,329 B1 | 3/2007 | Wood et al. |
| 7,205,933 B1 | 4/2007 | Snodgrass |
| 7,212,175 B1 | 5/2007 | Magee et al. |
| 7,212,532 B1 | 5/2007 | McFarland et al. |
| 7,212,920 B1 | 5/2007 | Bailey et al. |
| 7,213,055 B1 | 5/2007 | Kathol |
| 7,216,296 B1 | 5/2007 | Broberg et al. |
| 7,218,123 B1 | 5/2007 | Tsamis et al. |
| 7,219,011 B1 | 5/2007 | Barber |
| 7,230,613 B1 | 6/2007 | Steffensmeier et al. |
| 7,230,999 B1 | 6/2007 | Deines et al. |
| 7,242,343 B1 | 7/2007 | Woodell |
| 7,262,713 B1 | 8/2007 | Vogl et al. |
| 7,272,472 B1 | 9/2007 | McElreath |
| 7,292,178 B1 | 11/2007 | Woodell et al. |

OTHER PUBLICATIONS

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

* cited by examiner

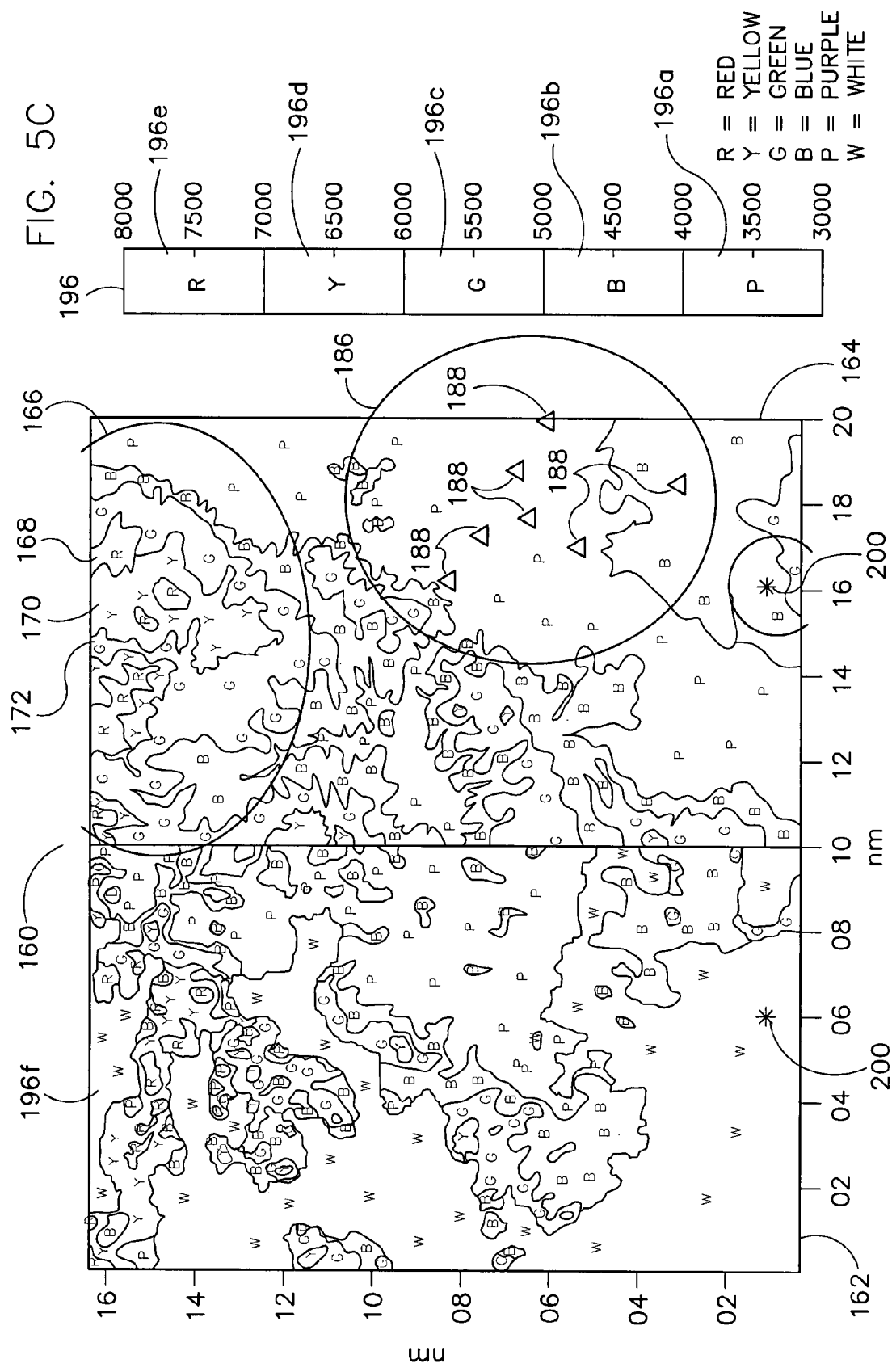

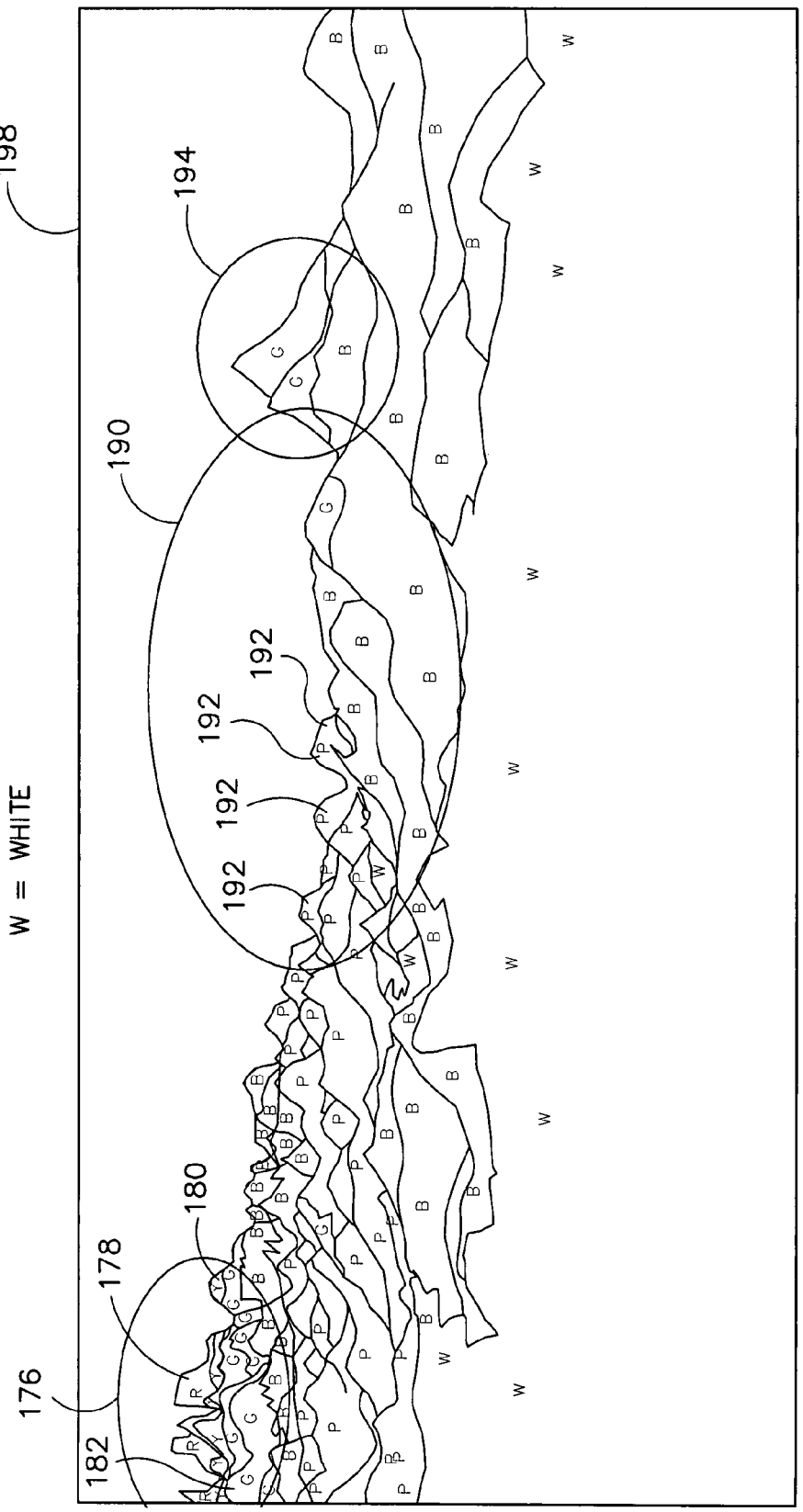

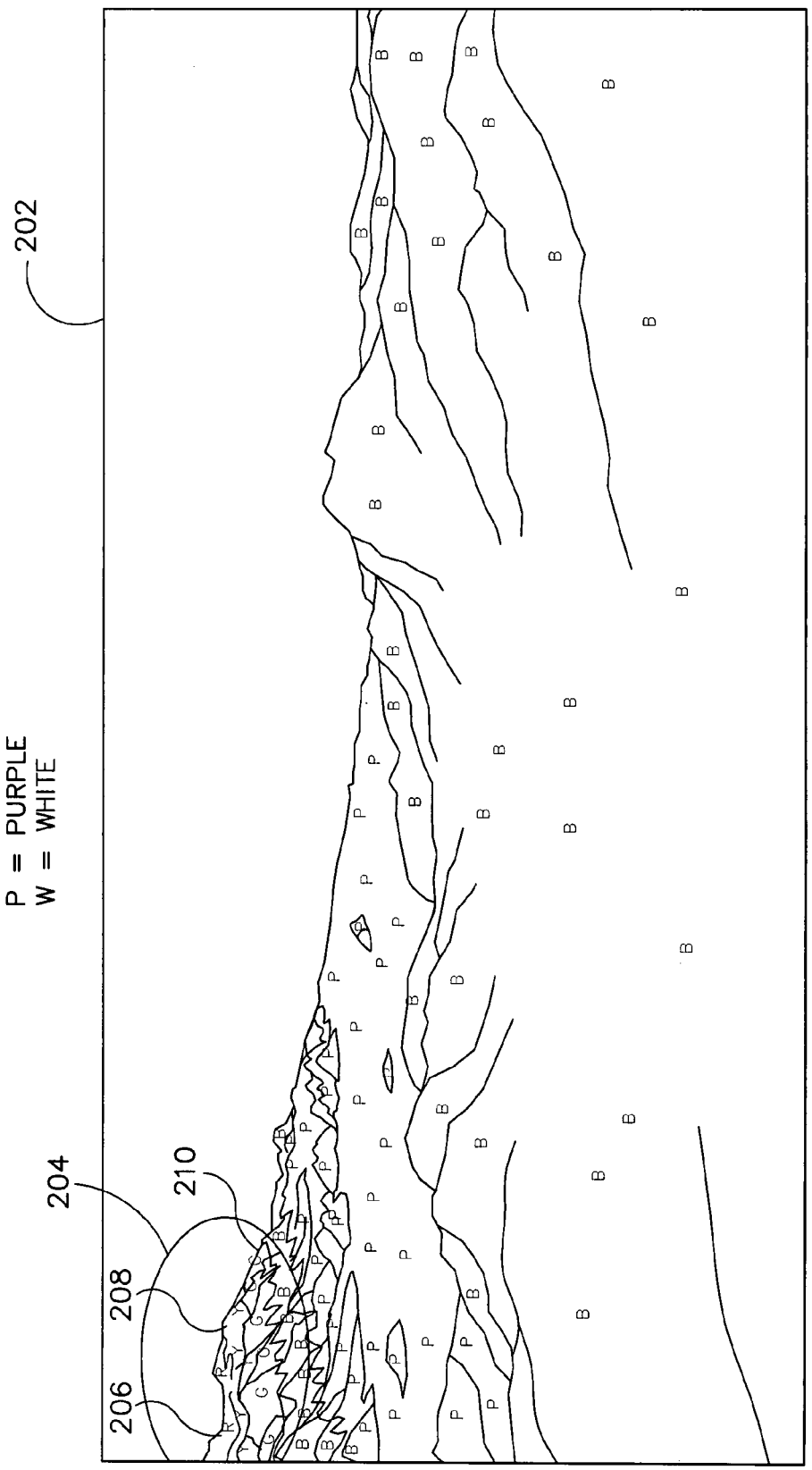

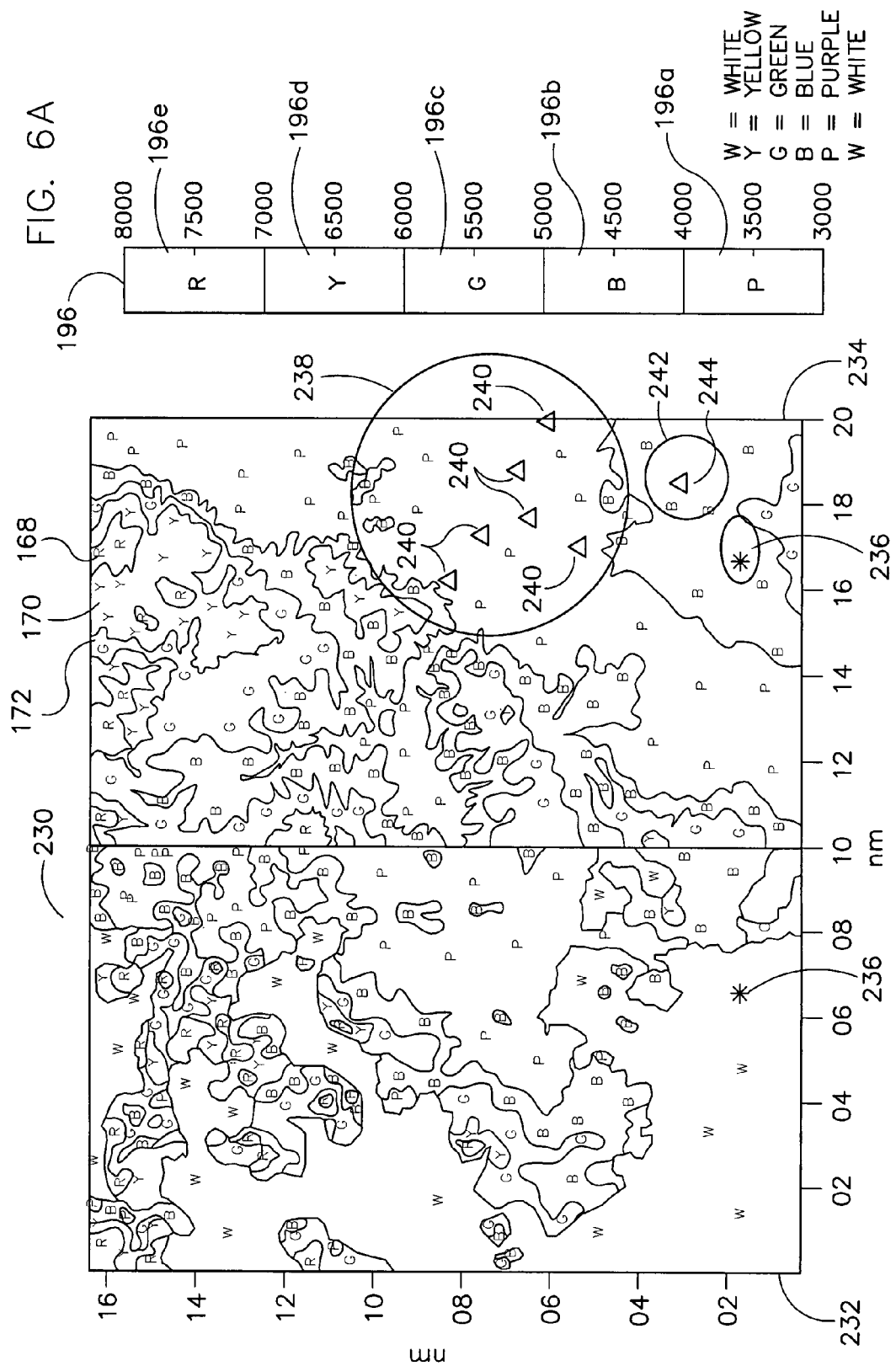

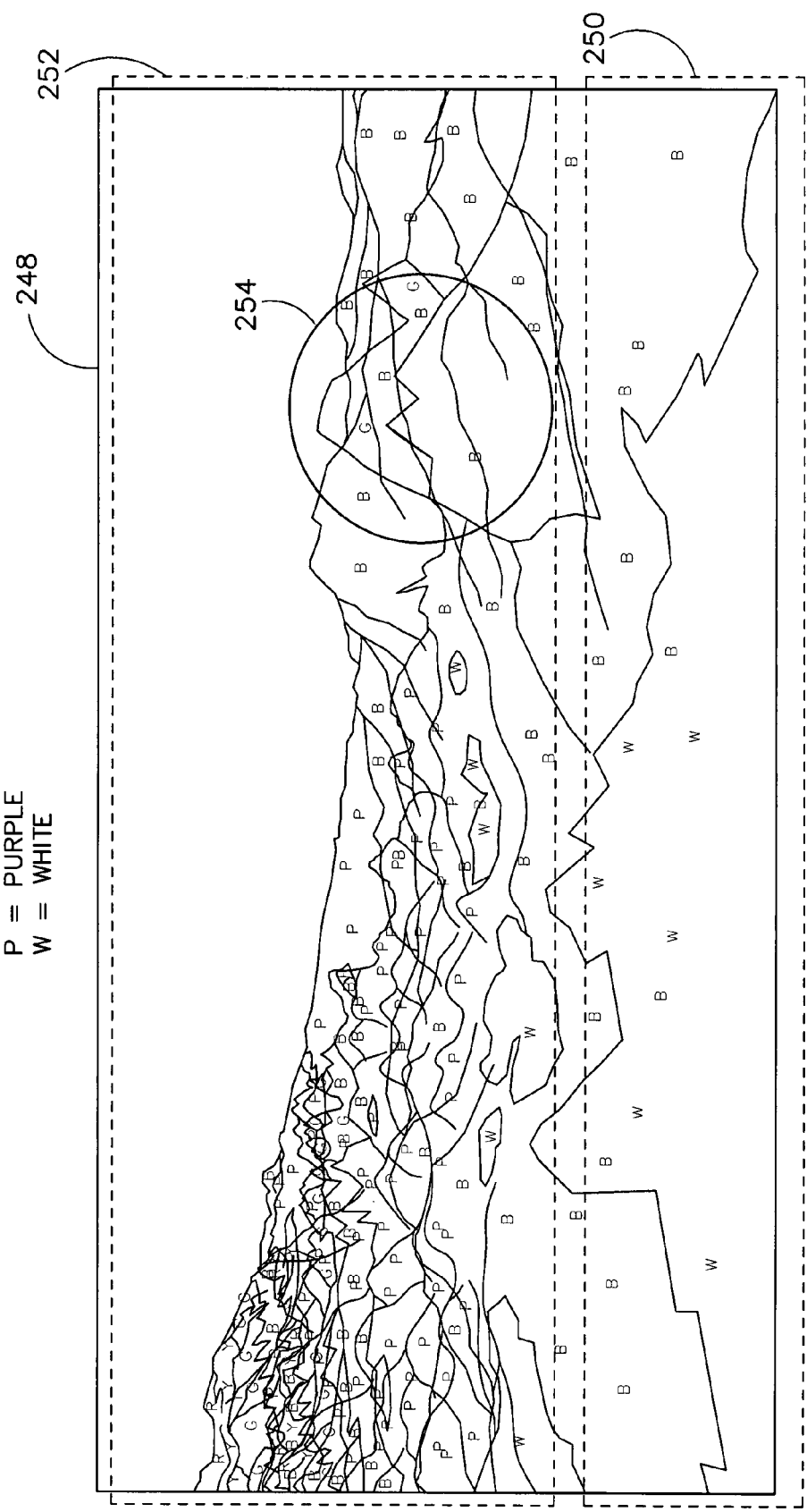

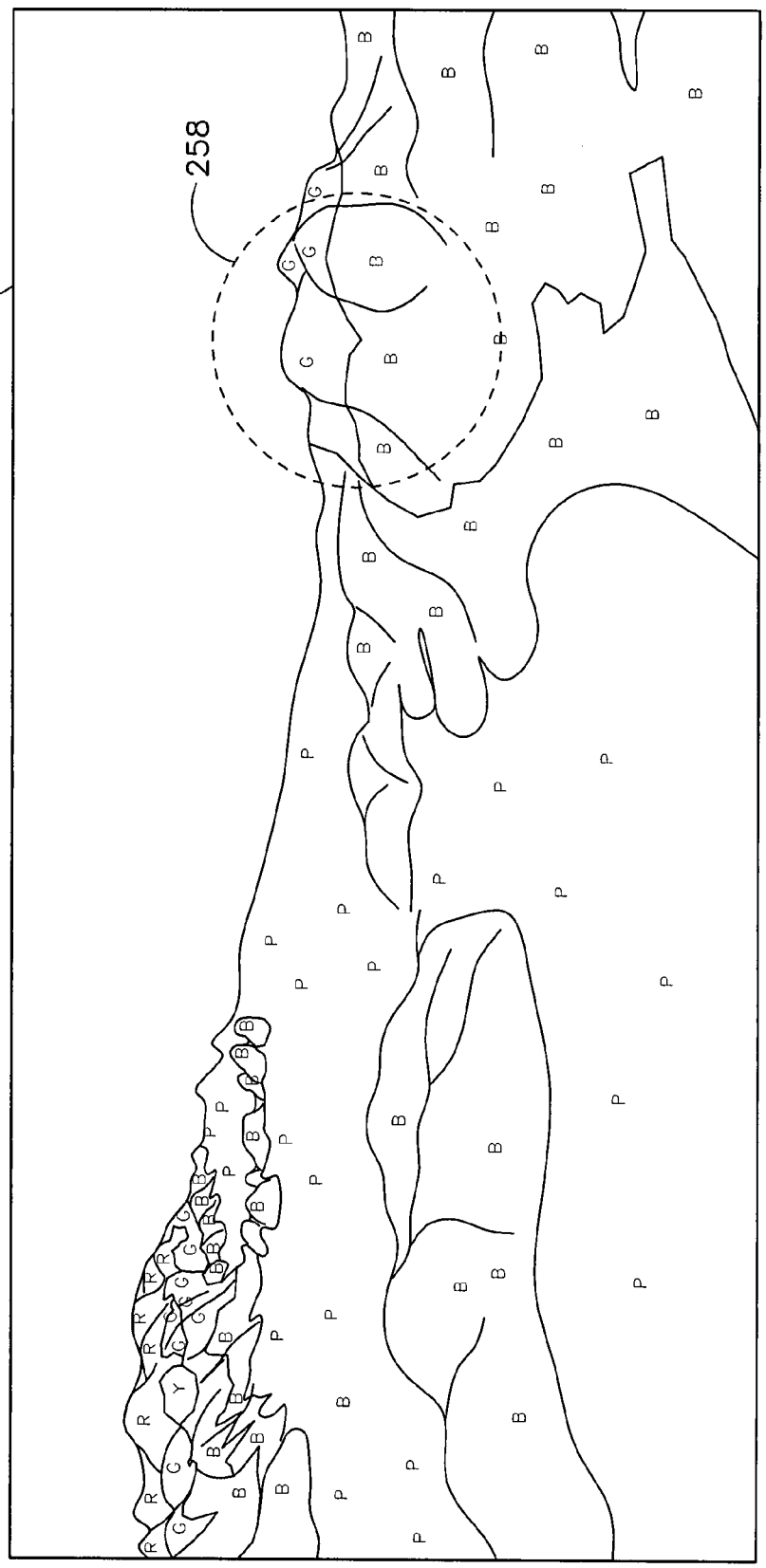

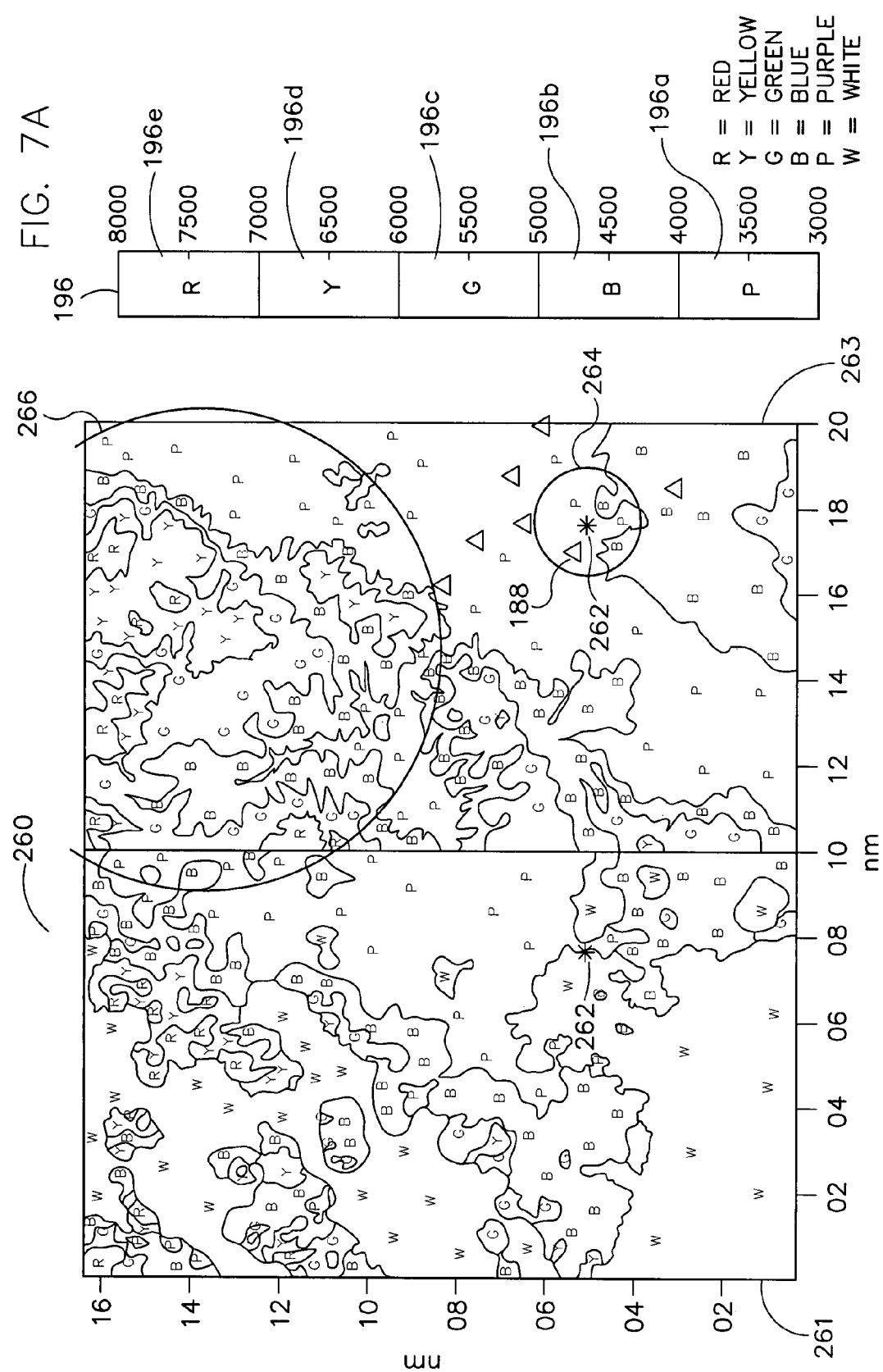

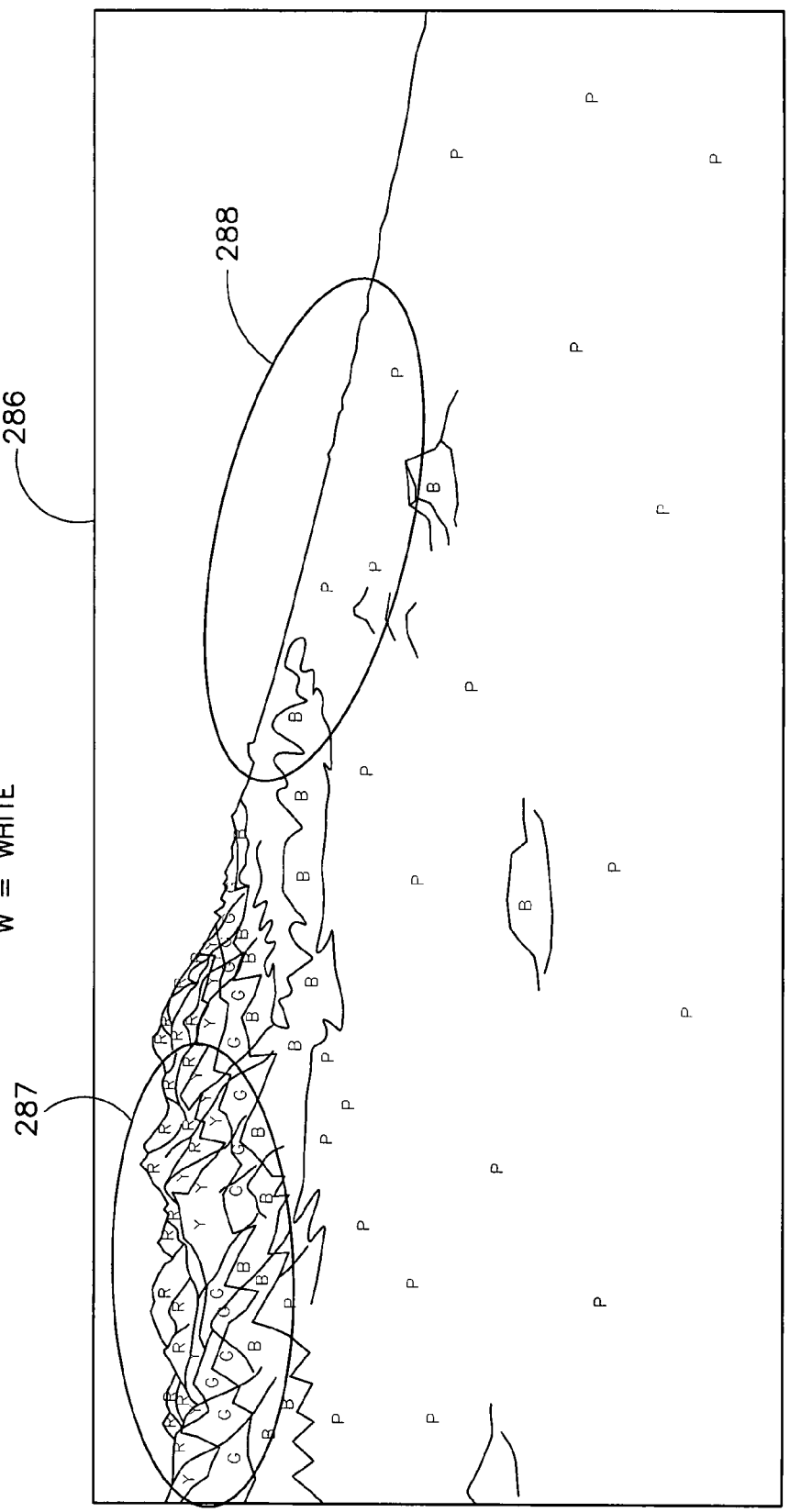

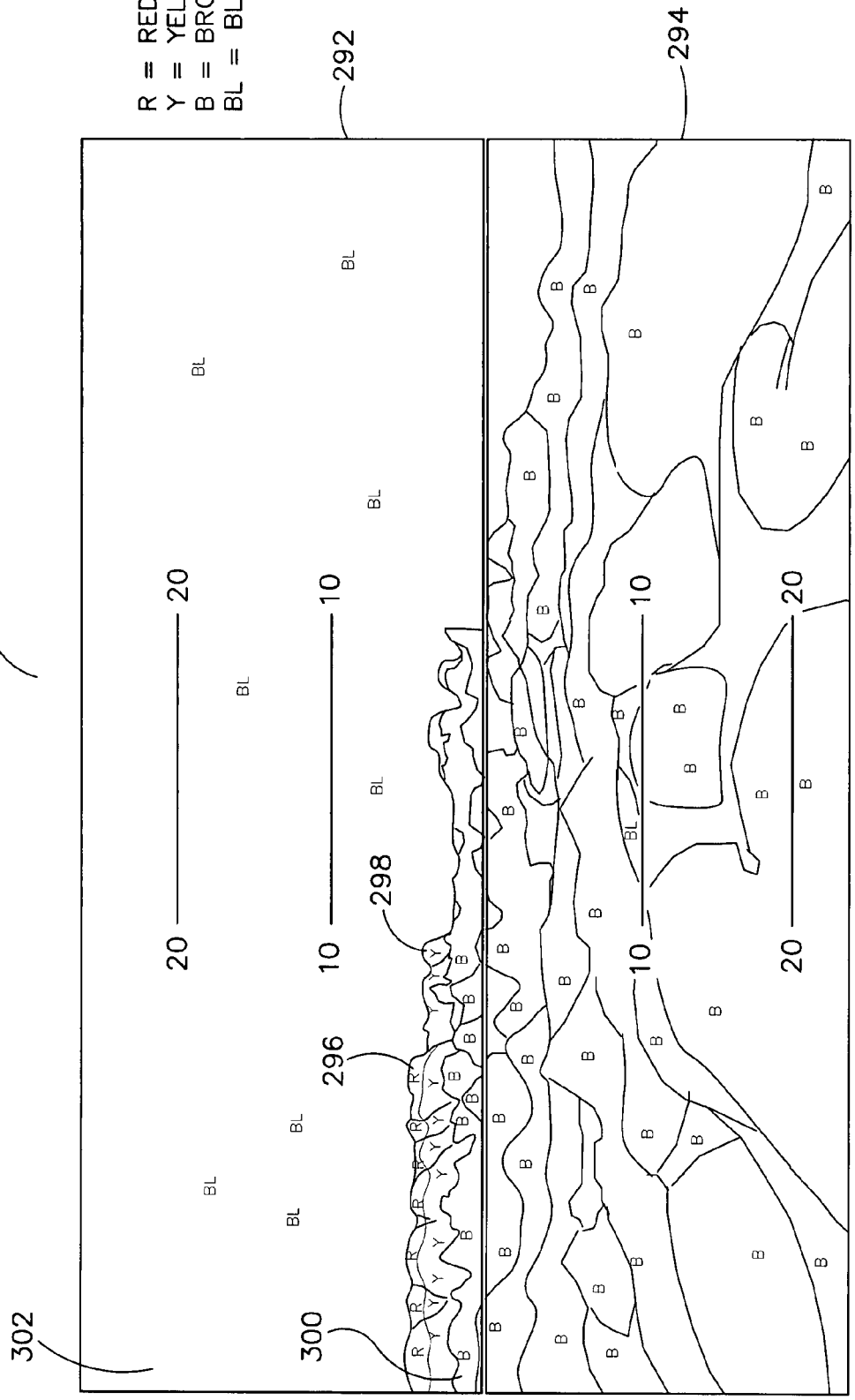

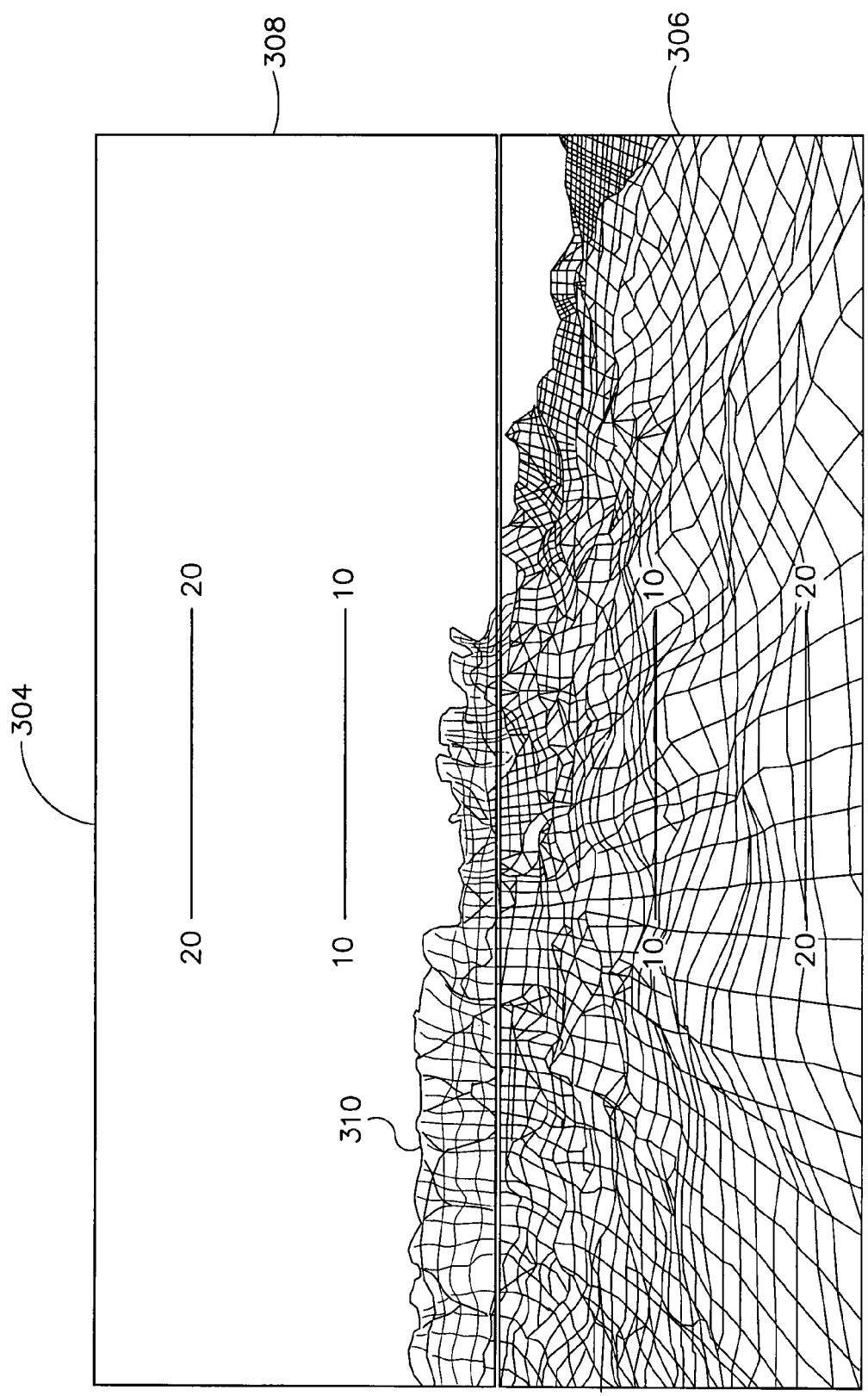

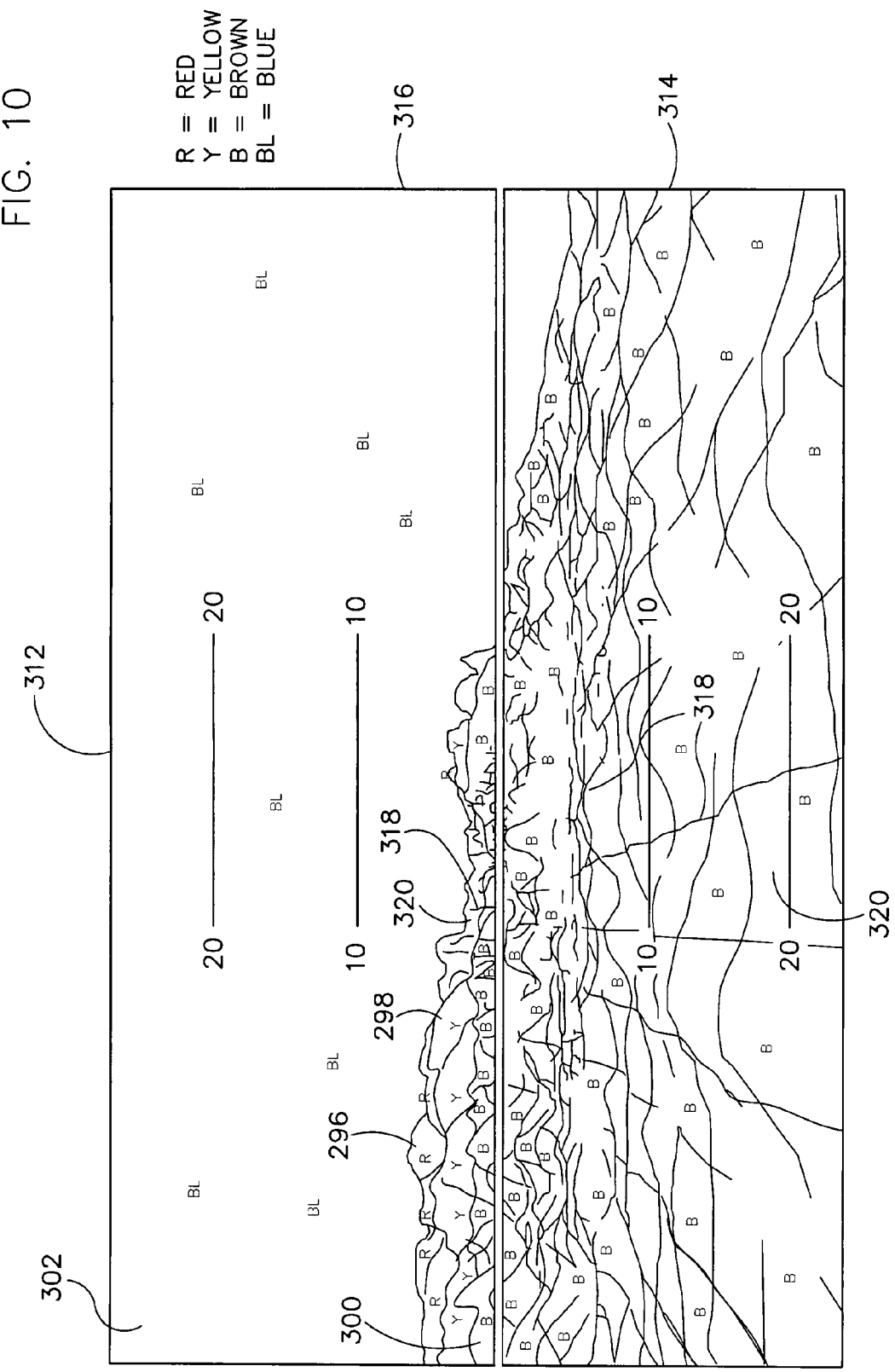

SYSTEM AND METHOD FOR DISPLAYING RADAR-ESTIMATED TERRAIN

BACKGROUND

The present disclosure relates generally to the field of display systems. More specifically, the present disclosure relates to a method for displaying radar-estimated terrain on a flight display in an aircraft.

Terrain awareness warning systems provide aircrews with information regarding the terrain. Standard TSO-C151b is utilized by the Federal Aviation Administration ("FAA") to specify four functions for a terrain awareness warning system. These functions are terrain display, premature descent alerting, ground proximity alerting and forward-looking terrain alerting. The terrain information is transmitted to a display, which provides alerts for the aircrew.

The terrain display allows the pilot to estimate the distance and bearing to terrain cells of interest. The display can be oriented with the aircraft positioned at the bottom of the display and the track of the aircraft in the upward direction; however, other orientations are allowed by the regulations.

The display is formatted in such a way as to ensure that the pilot can differentiate between terrain that is above the aircraft and terrain that is below the aircraft. The display also provides a means to distinguish between terrain cells that represent a potential hazard to the aircraft and non-hazardous terrain cells.

The color scheme for the terrain display can be determined through extensive prototyping and human factors studies. The following colors are commonly used in terrain displays. Blue or cyan for the sky. Red for terrain above the aircraft's altitude. Yellow or amber for terrain just below the aircraft's altitude. A neutral color for terrain that is well below the aircraft's altitude (i.e., non-hazardous terrain). The neutral color may be green, brown, tan, some other pastel color, or even a photo-realistic rendering.

Terrain awareness warning system can utilize a database to generate the display image. Terrain awareness warning system displays that use databases are subject to three basic error conditions, including position errors from the navigation system (e.g. the Global Positioning System ("GPS"), altitude or heading errors from the inertial sensors (e.g. the Altitude Heading Reference System ("AHRS")), and terrain elevation errors from the terrain database. These error sources can cause significant problems for aircrews.

There is a need for a method of displaying terrain utilizing an enhanced vision system and a radar system to provide and/or validate a terrain display. Therefore, there is a need for an improved method of creating a terrain image such that the pilot of the aircraft can make better-informed decisions.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to an aircraft, including a display for receiving a display signal representative of terrain and a terrain data circuit. The terrain data circuit includes an interface for coupling to the radar system and the display. The terrain data circuit also includes a display control circuit configured to transmit the display signal representative of terrain and to process a first terrain data received from the radar system. The terrain data circuit is configured to provide the display signal representative of terrain based on a first terrain data.

Another embodiment of the disclosure relates to a method of displaying a terrain image on a display. The method includes the steps of receiving a first terrain data from a radar system, providing a first display signal representative of terrain based on the first terrain data, and transmitting the first display signal representative of terrain.

Another embodiment of the disclosure relates to an aircraft, including a display for receiving a display signal representative of terrain and a terrain data circuit. The terrain data circuit includes an interface means for coupling to a radar system and the display. The terrain data circuit also includes a means for controlling a display circuit configured to control the display and a means for processing a first terrain data received from the radar system. The terrain data circuit is configured to provide a terrain image to transmit to the display.

BRIEF DESCRIPTION OF THE DRAWINGS

The disclosure will become more fully understood from the following detailed description, taken in conjunction with the accompanying drawings.

FIG. 5C is an illustration of a radar-based terrain utilizing an altitude plot scan that can be displayed on a flight display screen of the aircraft control center of FIG. 1 versus a database-based terrain, according to an exemplary embodiment;

FIG. 5D is an illustration of a perspective view of the terrain utilizing multiple horizontal radar scans averaged over several scans, according to an exemplary embodiment;

FIG. 5E is an illustration of a perspective view of the terrain in FIG. 5C utilizing a terrain database, according to an exemplary embodiment;

FIG. 6A is another illustration of a radar-based terrain utilizing an altitude plot scan that can be displayed on a flight display screen of the aircraft control center of FIG. 1 versus a database-based terrain, according to an exemplary embodiment;

FIG. 6B is an illustration of a perspective view of the terrain utilizing multiple horizontal radar scans averaged over several scans highlighting a tower on the terrain, according to an exemplary embodiment;

FIG. 6C is an illustration of a perspective view of the terrain in FIG. 6B utilizing a terrain database where the database is missing the tower, according to an exemplary embodiment;

FIG. 7A is an illustration of a radar-based terrain image that is eight miles from aircraft that can be displayed on a flight display screen of the aircraft control center of FIG. 1 versus a database-based terrain, according to an exemplary embodiment;

FIG. 7C is an illustration of a perspective view of the terrain that is eight miles from aircraft in FIG. 7B utilizing a terrain database, according to an exemplary embodiment;

FIG. 8 is an illustration of radar-based terrain in an ego-centric view, according to an exemplary embodiment;

FIG. 9 is an illustration of radar-based terrain in a wireframe view, according to an exemplary embodiment;

FIG. 10 is an illustration of radar-based terrain depicted in a wireframe view overlaid on a synthetic vision system image from a database, according to an exemplary embodiment;

DETAILED DESCRIPTION OF THE PREFERRED EMBODIMENTS

Although the description below contains many specificities, these specificities are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, chemical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Figure 1:
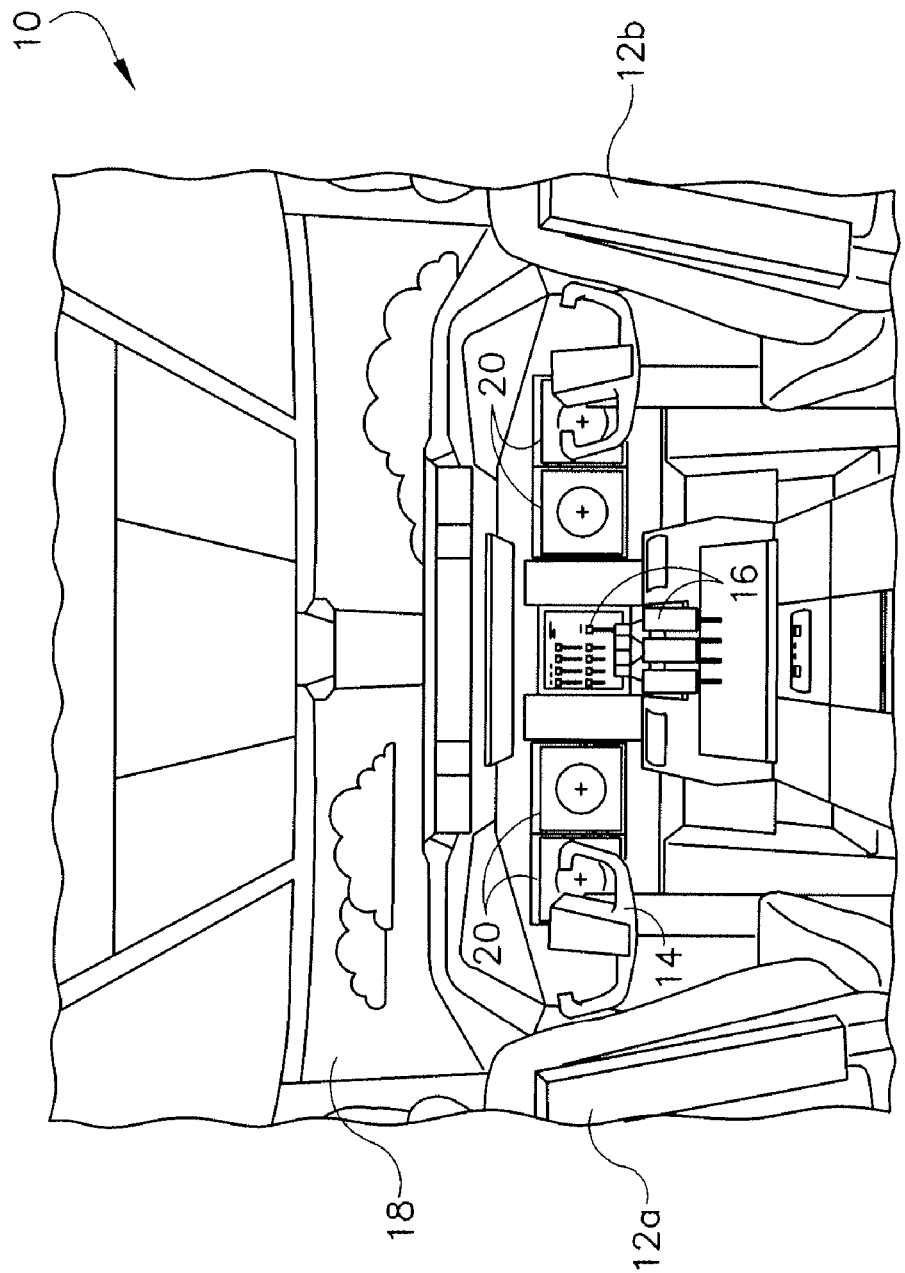
FIG. 1 is an illustration of an aircraft control center or cockpit, according to one exemplary embodiment.

Referring to FIG. 1, an illustration of an aircraft control center or cockpit 10 is shown, according to one exemplary embodiment. Aircraft control center 10 includes a pilot seat 12a, a co-pilot seat 12b, an aircraft control stick 14, flight controls 16 and flight displays 20. The pilot sitting in pilot seat 12a may utilize aircraft control stick 14 or other control devices to maneuver airplane 10. The pilot may initiate airplane 10 maneuvers including moving airplane 10 in an upwardly motion, downwardly motion, banking to the left, banking to the right or any combination thereof. The pilot can visually monitor the flight path through windshield 18. However, when the pilot utilizes windshield 18, his visual range is limited.

The crew utilizes flight displays 20 to increase their visual range and to enhance their decision-making abilities. In an exemplary embodiment, flight displays 20 may be configured to show weather, terrain (i.e., mountains or hills), fixed obstacles (i.e., towers), variable obstacles (i.e., other airplanes), flight characteristics (i.e., altitude or speed), or any combination thereof.

Figure 2:
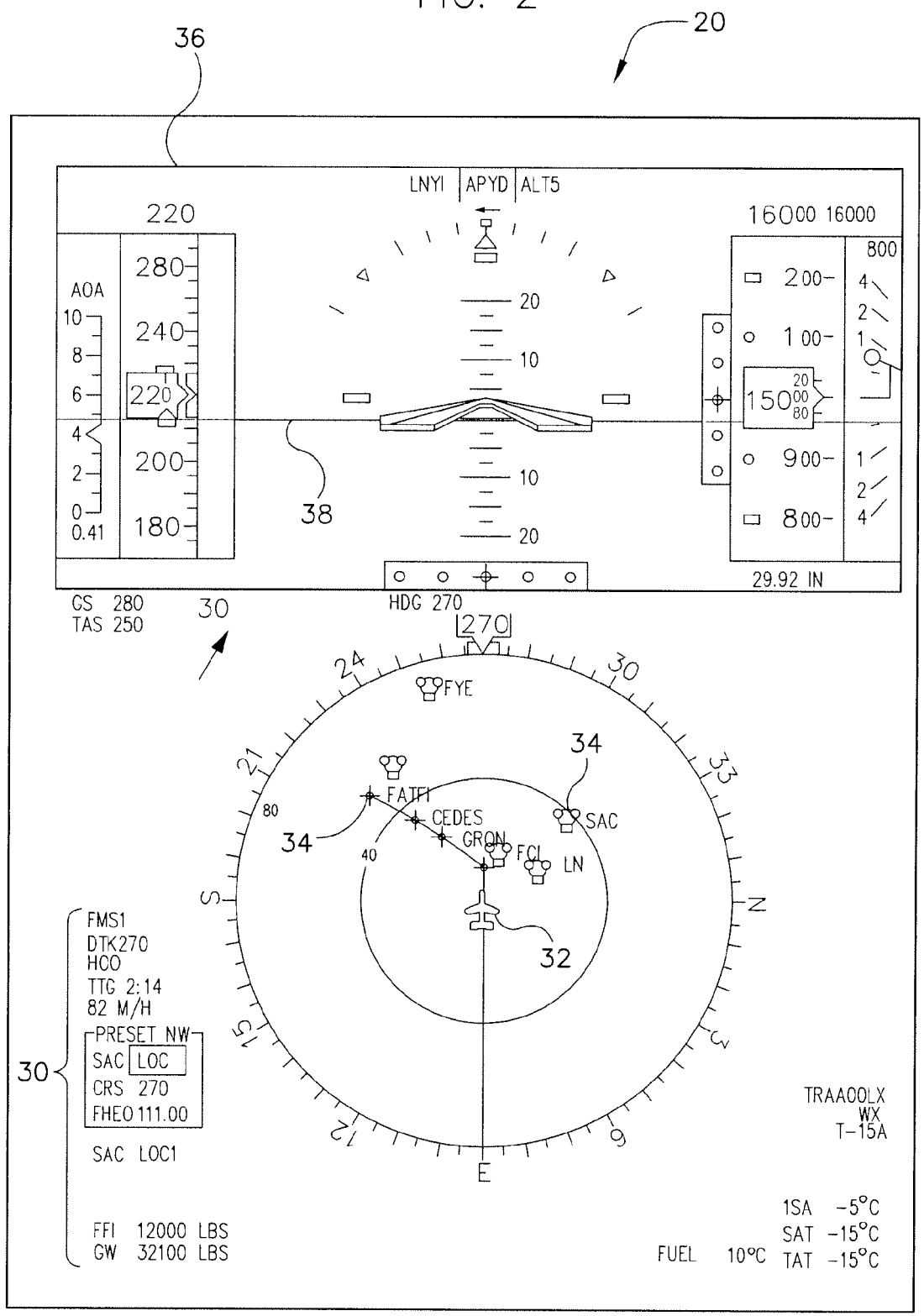
FIG. 2 is an illustration of a flight display screen in the aircraft control center of FIG. 1, according to an exemplary embodiment.

Referring to FIG. 2, an illustration of a flight display screen in the aircraft control center of FIG. 1 is shown, according to an exemplary embodiment. In an exemplary embodiment, flight display 20 may indicate flight characteristics 30, an airplane position 32 and NAVAIDS ("Navigational Aid System") 34. Flight characteristics 30 may include altitude or speed of the aircraft. Flight display 20 can include a forward view 36 with a horizon line indicator 38.

Figure 3A:
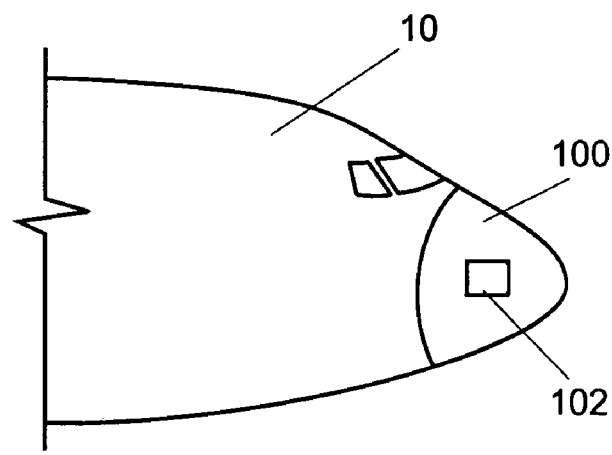
FIG. 3A is an illustration of the aircraft's nose including the aircraft controller center of FIG. 1, according to an exemplary embodiment.

In FIG. 3A, an illustration view of the nose of the aircraft including the aircraft controller center of FIG. 1 is shown, according to an exemplary embodiment. According to an exemplary embodiment, radar system 102 can be located inside the nose 100 of the aircraft. According to another exemplary embodiment, radar system 102 may be located on the top of the aircraft, on the tail of the aircraft or any portion of aircraft that enables radar system 102 to generate forward-looking data.

Referring to FIG. 3A, aircraft cone section 100 including a terrain data circuit 110 (see FIG. 4) and radar system 102 is shown, according to an exemplary embodiment. In an exemplary embodiment, terrain data circuit 110 utilizes a broad band directional receiver and an active radar for detection of terrain or obstacle sources. In an exemplary embodiment, an active radar includes a transmitting device. It should be noted that the terrain and/or obstacle source can be any source detectable by radar system 102 and/or terrain data circuit 110.

Figure 3B:
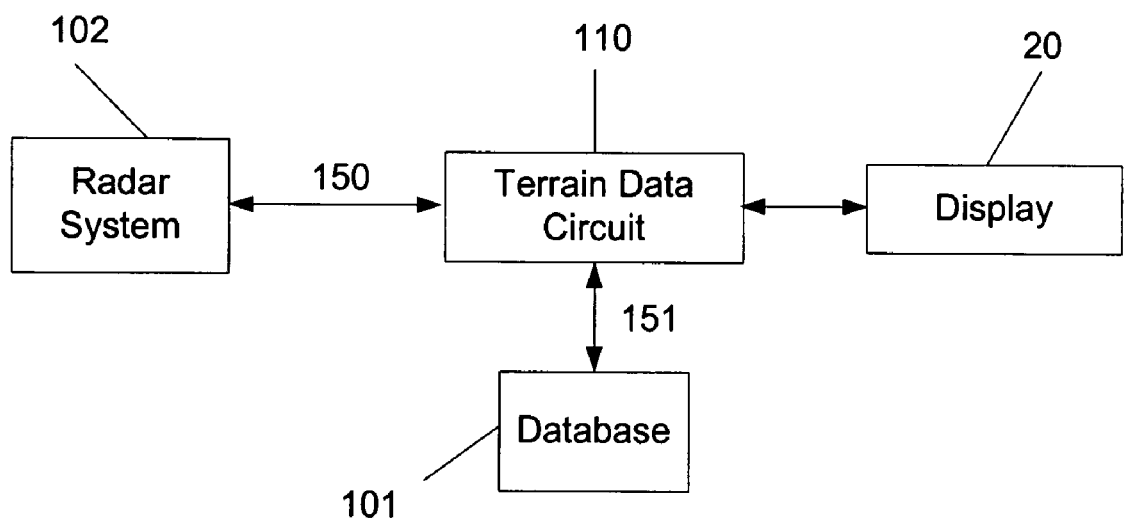
FIG. 3B is a block diagram of the terrain display system in the aircraft control center of FIG. 1, according to one exemplary embodiment.

Referring to FIG. 3B, a block diagram of the terrain display system in the aircraft control center of FIG. 1 is shown, according to an exemplary embodiment. In an exemplary embodiment, radar system 102 is coupled to terrain data circuit 110. In an exemplary embodiment, radar system 102 transmits a first terrain data to terrain data circuit 110. In an exemplary embodiment, first terrain data can be radio frequency data, digital data, an altitude plot scan or any other data from radar system 102. In an exemplary embodiment, terrain data circuit 110 can be coupled to terrain database 101. According to an exemplary embodiment, terrain database 101 may be a Terrain Awareness and Warning System ("TAWS"). In an exemplary embodiment, an altitude heading reference system ("AHRS") and/or an inertial reference system ("IRS") may provide the pilot with information regarding the altitude of the plane. In an exemplary embodiment, terrain data circuit 110 can provide information related to the aircraft position relative to the terrain and any potential hazards based on current flight characteristics and/or current airplane performance characteristics. In an exemplary embodiment, terrain data circuit 110 can be coupled to flight display 20, outputting a terrain image to display for the pilot.

In an exemplary embodiment, radar system 102 includes a radar receiver 105 (see FIG. 4), which is in communication with an antenna 103. In an exemplary embodiment, radar receiver 105 is a transceiver. In an exemplary embodiment, radar system 102 is configured to include all the functionality of a WRT-4100 model. The WRT-4100 may be purchased from Rockwell Collins, Cedar Rapids, Iowa 52498. In another exemplary embodiment, radar system 102 includes any forward-looking radar system and is not limited to weather radars. In an exemplary embodiment, aircraft cone section 100 may also include equipment associated with a TAWS, Ground Proximity Warning System ("GPWS"), a Ground Collision Avoidance Systems ("GCAS"), a Weather Radar ("WRT") or any combination thereof. In an exemplary embodiment, terrain data circuit 110 can include a database. In an exemplary embodiment, flight display 20 can be an audio display, a visual display or both.

In an exemplary embodiment, terrain data circuit 110 may be utilized in combination with another terrain awareness warning system that employees a terrain database to communicate with aircrew that the aircraft's flight path may be on an imminent collision course with an obstacle. The terrain awareness warning system that employs a terrain database may include a GPWS, a Ground Collision Avoidance Systems, a TAWS or any combination thereof.

Figure 4:
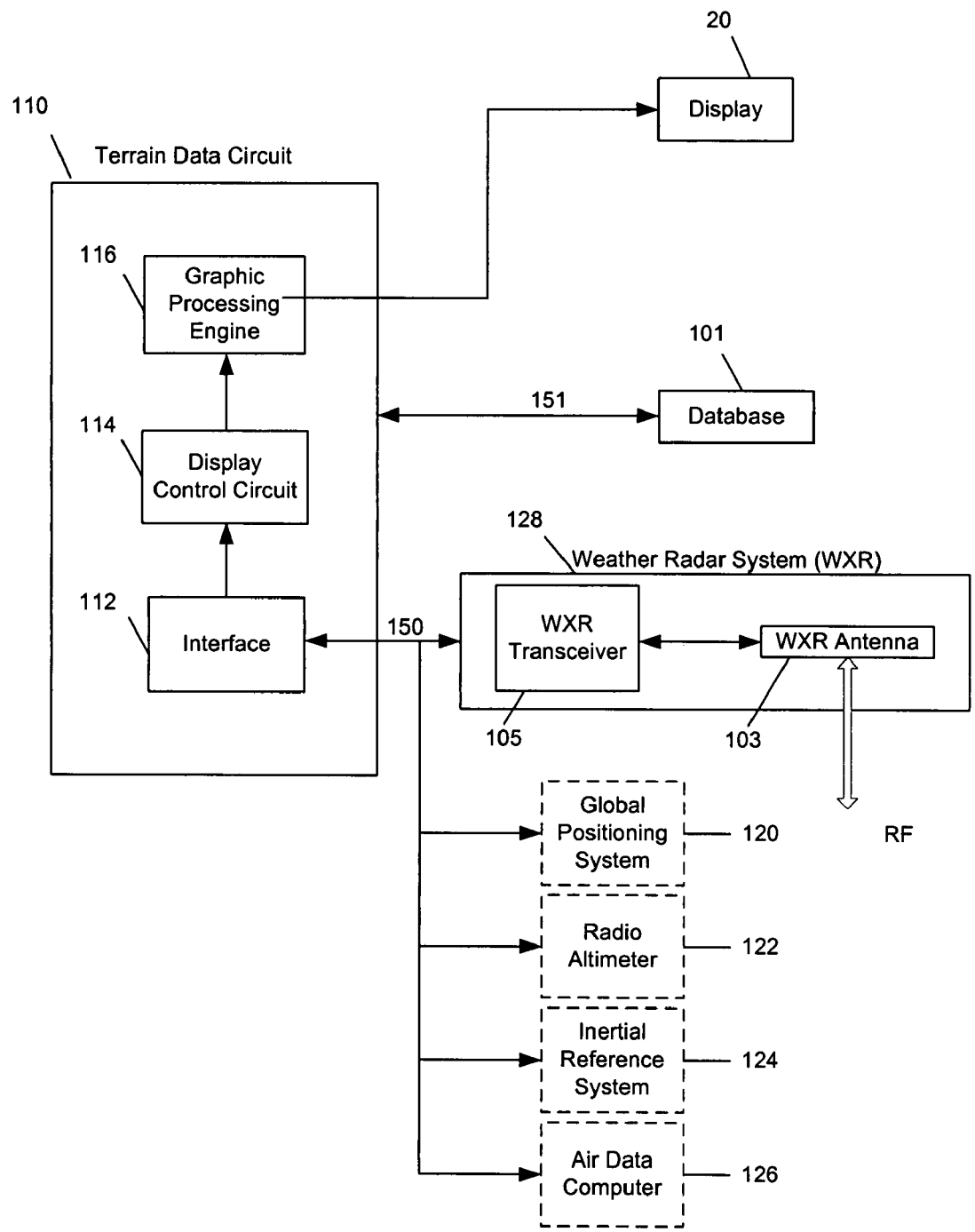
FIG. 4 is another block diagram of the terrain display system, according to one exemplary embodiment.

In FIG. 4, a block diagram of the terrain display system is shown, according to an exemplary embodiment. In an exemplary embodiment, radar system 102 may be different types of radars. Radar system 102 can be a weather radar system ("WXR") 128 and can receive a radio frequency ("RF") signal using a WXR antenna 103. In an exemplary embodiment, WXR transceiver 105 can receive a signal, which WXR transceiver 105 passes to terrain data circuit 110. In an exemplary embodiment, terrain data circuit 110 processes the signal and generates a signal representative of terrain. In an exemplary embodiment, terrain data circuit 110 can be in communication with radar system 102, a global positioning system (GPS) 120, a radio altimeter 122, an inertial reference system 124, an air data computer 126, database 101, flight display 20 and/or weather radar system 128.

In an exemplary embodiment, terrain data circuit 110 can receive multiple types of radar data. In an exemplary embodiment, interface 112 may be responsible for accepting radar input and relaying information to display control circuit 114. In an exemplary embodiment, terrain data circuit 110 can be coupled to database 101. Database 101 can be part of a database-based terrain awareness warning system. In an exemplary embodiment, interface 112 is configured to request terrain data from database 101 and/or the database-based terrain awareness warning system. In this exemplary embodiment, database 101 and/or database-based terrain awareness warning system is configured to transmit the requested information.

In an exemplary embodiment, terrain data circuit 110 can receive data from weather radar system 128 and database 101. In this exemplary embodiment, terrain data circuit 110 can initiate a comparison of the data received from weather radar system 128 and database 101. Terrain data circuit 110 can generate a discrepancy report based on this comparison. The discrepancy report is generated by a reporting logic. In an exemplary embodiment, terrain data circuit 110 can generate a composite image based on the comparison. In another exemplary embodiment, terrain data circuit 110 can receive data from GPS 120 to determine the exact position of the aircraft and to receive data from database 101 regarding the surrounding area.

In an exemplary embodiment, display control circuit 114 can control the image on flight display 20. In another exemplary embodiment, the aircrew can alter the image on flight display 20 based on aircrew preferences. It should be noted that aircrew preferences that are known to those skilled in the art are incorporated in this disclosure. According to one exemplary embodiment, terrain data circuit 110 may process first terrain data received from radar system 102 to generate a signal representative of terrain. In an exemplary embodiment radar system 102 can be multiple radar systems 102.

According to another exemplary embodiment, terrain data circuit 110 may process first terrain data received from radar system 102 and a second terrain data from terrain database 101 to generate a signal representative of terrain. In an exemplary embodiment, terrain data circuit 110 may process second terrain data from terrain database 101 to generate a signal representative of terrain.

In an exemplary embodiment, terrain data circuit 110 can contain graphics processing engine 116. In an exemplary embodiment, graphics processing engine 116 may display the terrain image as a wireframe view, a synthetic system view, a composite view consisting of a wireframe view and a synthetic view, and/or any combination thereof. In an exemplary embodiment, terrain data circuit 110 without graphics processing engine 116 may display terrain image as a wireframe view, a synthetic system view, a composite view consisting of a wireframe and a synthetic view, and/or any combination thereof.

In an exemplary embodiment, terrain data circuit 110 can be coupled to flight display 20 and provide an input to flight display 20 to cause a desired image to be displayed on flight display 20. In an exemplary embodiment, the information may be displayed as an altitude plot scan.

Figure 5A:
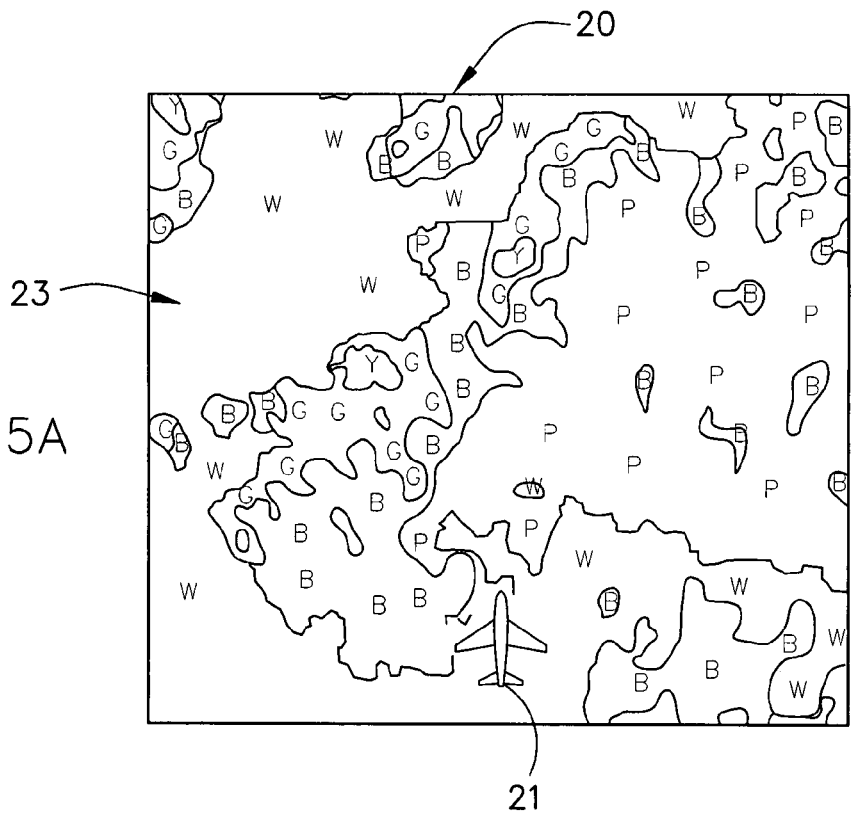
FIGS. 5A and 5B are illustrations of a radar-based terrain utilizing an altitude plot scan that can be displayed on a flight display screen of the aircraft control center of FIG. 1, according to an exemplary embodiment.
Figure 5B:
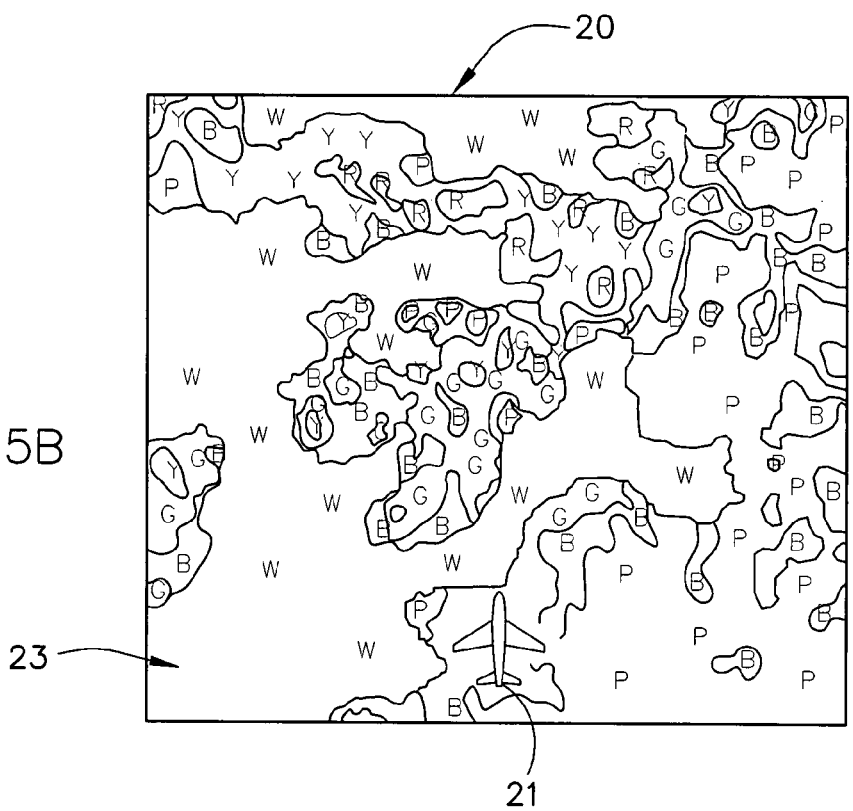

FIGS. 5A and 5B show illustrations of a radar-based terrain utilizing an altitude plot scan that can be displayed on a flight display screen of the aircraft control center of FIG. 1, according to exemplary embodiments. In an exemplary embodiment, flight display 20 can be a track-up moving-map style display with an aircraft image 21 in a fixed position at the bottom of flight display 20. In an exemplary embodiment, a terrain profile 23 will move from top to bottom as airplane 10 flies forward. In an exemplary embodiment, flight display 20 can utilize red terrain cells to indicate terrain above airplane 10. In an exemplary embodiment, flight display 20 can utilize yellow terrain cells to indicate terrain at or just below airplane 10. In an exemplary embodiment, flight display 20 can utilize a neutral-colored terrain cells for terrain below yellow but not more than two thousand (2,000) feet below airplane 10.

In another exemplary embodiment, the database display (see FIGS. 5D, 6C, 7C and 10) can have a similar color scheme, but all terrain below yellow will be shown. In an exemplary embodiment, the database display can be a high-resolution relief map of the terrain surrounding airplane 10. In another exemplary embodiment, a hybrid display (see FIG. 10) can be created utilizing the database to create a high-resolution relief map with terrain data circuit 110 producing only red and yellow terrain cells for hazardous terrain along the projected path of airplane 10. In this exemplary embodiment, only threatening terrain cells along the path will be shown in red and/or yellow instead of all terrain cells surrounding airplane 10 that are above airplane's 101 altitude, at airplane's 101 altitude or just below airplane's 101 altitude.

In FIG. 5C, an illustration of a radar-based terrain utilizing an altitude plot scan that can be displayed on a flight display screen of the aircraft control center of FIG. 1 versus a database-based terrain is shown, according to an exemplary embodiment. In an exemplary embodiment, a first radar terrain versus database terrain screen 160 includes a first radar terrain image 162 and a first database terrain image 164. In an exemplary embodiment, first radar terrain image 162 is an altitude plot scan where airplane 10 is at a first position 200. In this exemplary embodiment, first database terrain image 164 is based on airplane 10 being at first position 200. In this exemplary embodiment, first radar terrain image 162 and first database terrain image 164 are based on airplane 10 being at an altitude of five thousand eight hundred and eighty-four (5,884) feet mean sea level.

In an exemplary embodiment, an altitude scale 196 indicates the altitude level on first radar terrain versus database terrain screen 160. In an exemplary embodiment, a purple section 196a indicates an altitude from three thousand (3,000) feet mean sea level to four thousand (4,000) feet mean sea level. In this exemplary embodiment, a blue section 196b indicates an altitude from four thousand and one (4,001) feet mean sea level to five thousand (5,000) feet mean sea level. In this exemplary embodiment, a green section 196c indicates an altitude from five thousand and one (5,001) feet mean sea level to six thousand (6,000) feet mean sea level. In this exemplary embodiment, a yellow section 196d indicates an altitude from six thousand and one (6,001) feet mean sea level to seven thousand (7,000) feet mean sea level. In this exemplary embodiment, a red section 196e indicates an altitude from seven thousand an one (7,001) feet mean sea level to eight thousand (8,000) feet mean sea level. In this exemplary embodiment, a white section 196f is an area on radar terrain image 162 that is below the line of sight of radar system 102.

FIGS. 6A, and 7A show embodiments of a top-down view of both radar detected terrain and database terrain. These embodiments show a fixed map presentation versus the moving map (i.e., airplane 10 moves through the map) represented by FIGS. 5A and 5B. It should be noted that both types of maps can be utilized with this disclosure and for simplicity the figures showing a fixed map presentation also represent a moving map presentation and the moving map presentation also represent a fixed map presentation.

These embodiments utilize non-standard colors to provide better resolution of the terrain altitude which allows for a comparison of the radar-detected terrain versus the database terrain. In these embodiments, terrain at airplane's 101 altitude is shown in green (G), terrain just above airplane's 10 altitude is shown in yellow (Y), and terrain well above airplane's 101 altitude is shown in red (R). Further, terrain just below airplane's 101 altitude is shown in blue (B) and terrain well below airplane's 101 altitude is shown in purple (P). Also, the white (W) areas on the radar-detected terrain maps indicate regions that are not visible to radar system 102 because these regions are below the scan region of radar system 102 and/or are in the shadows behind higher terrain cells. These embodiments shown a very strong correlation between hill tops in the radar-detected terrain maps and the database terrain maps.

Referring now to FIGS. 5A-5E, a first section of terrain database image 166 includes a high database terrain 168, a medium database terrain 170 and a low database terrain 172 (see FIG. 5C), according to an exemplary embodiment. In an exemplary embodiment, a perspective view of the terrain utilizing multiple horizontal radar scans averaged over several scans 198, a first section of terrain radar image 176 includes a high radar terrain 178, a medium radar terrain 180 and a low radar terrain 182 is shown in FIG. 5D. In an exemplary embodiment, a perspective view of a database terrain 202, a first section of perspective view of database terrain 204 includes a high perspective view database terrain 206, a medium perspective view database terrain 208 and a low perspective view database terrain 210 is shown in FIG. 5E. In these exemplary embodiments, first section of terrain database image 166, first section of terrain radar image 176 and first section of perspective view of database terrain 204 have a strong correlation to each other.

In these exemplary embodiments, high radar terrain 178 correlates to both high database terrain 168 and high perspective view database terrain 206. Further, medium radar terrain 180 correlates to both medium database terrain 170 and medium perspective view database terrain 208. Also, low radar terrain 182 correlates to both low database terrain 172 and low perspective view database terrain 210.

In FIG. 5D, a radar-detected terrain data rendered in an egocentric perspective display format is shown, according to an exemplary embodiment. In FIG. 5E, a database terrain data in a similar egocentric perspective display format is shown, according to an exemplary embodiment. As shown by FIGS. 5D and 5E, there is a significant correlation between the horizon lines in both figures.

Referring now to FIG. 5C, a second section of terrain database image 186 includes a terrain tower location 188, according to an exemplary embodiment. In this exemplary embodiment, second section of terrain database image 186 has multiple terrain tower locations 188. Referring now to FIG. 5D, a second section of terrain radar image 190 includes a first radar tower location 192, according to an exemplary embodiment. In these exemplary embodiments, terrain tower location 188 and first radar tower location 192 have a strong correlation to each other.

In FIG. 5D, a second radar tower location 194 is shown, according to an exemplary embodiment. Referring now to FIGS. 5A, 5B, 5C and 5D, first database terrain image 164 and a perspective view of a database terrain 202 do not show a tower location corresponding to second radar tower location 194. In an exemplary embodiment, second radar tower location 194 is an anomaly in the radar scan that can be filtered out by processing multiple scans from radar system 102. It should be noted that the anomaly has been eliminated in FIG. 6A.

In FIG. 6A, an illustration of a radar-based terrain utilizing an altitude plot scan that can be displayed on a flight display screen of the aircraft control center of FIG. 1 versus a database-based terrain is shown, according to an exemplary embodiment. In an exemplary embodiment, a second radar terrain versus database terrain screen 230 includes a second radar terrain image 232 and a second database terrain image 234. In an exemplary embodiment, second radar terrain image 232 is an altitude plot scan where airplane 10 is at a second position 236. In an exemplary embodiment, second database terrain image 234 is based on airplane 10 being at second position 236. In this exemplary embodiment, both second radar terrain image 232 and second database terrain image 234 are based on airplane 10 being at an altitude of five thousand eight hundred and eighty (5,880) feet mean see level. In an exemplary embodiment, altitude scale 196 indicates the altitude level on second radar terrain versus database terrain screen 230.

Referring now to FIGS. 6A, 6B and 6C, a third section of terrain database image 238 includes a tower below aircraft altitude 240. In this exemplary embodiment, there can be a plurality of tower below aircraft altitude 240. In an exemplary embodiment, a fourth section of terrain database image 242 includes a tower at aircraft altitude 244. In an exemplary embodiment, there can be a plurality of tower at aircraft altitude 244. In another exemplary embodiment, there can be towers above aircraft altitude.

In FIG. 6B, a perspective view of the radar terrain 248 includes a third section of terrain radar image 254. Third section of terrain radar image 254 indicates a tower is located on a hill, according to an exemplary embodiment. In an exemplary embodiment, a second perspective view database terrain 256 (see FIG. 6C) includes a second section of perspective view database terrain 258. Second section of perspective view database terrain 258 indicates that the tower is located on the same hill. In this exemplary embodiment, third section of terrain radar image 254 and second section of perspective view database terrain 258 are correlated to each other.

In an exemplary embodiment, towers below aircraft altitude 240 are well below airplane's 101 current altitude and get filtered out of the radar image by processing multiple scans. In an exemplary embodiment, terrain radar image 254 is a tower that is in proximate to airplane's 101 altitude and shows up prominently in the radar scan even through the processing of multiple scans.

It should be noted that radar system 102 can detect obstacle sources that are not detected by the terrain database. This can be caused by tower installation being installed but not entered into the database and/or the incorrect entry of the tower installation in the database.

In an exemplary embodiment, perspective view of the radar terrain 248 is based on a single scan of the terrain, a few scans of the terrain and/or a plurality of scans of the terrain. In another exemplary embodiment, perspective view of the radar terrain 248 is a composite of a first section of perspective view of the radar terrain 252 and a second section of perspective view of the radar terrain 250. In this exemplary embodiment, second section of perspective view of the radar terrain 250 is terrain below the current radar scan. In this exemplary embodiment, second section of perspective view of the radar terrain 250 is based on previous radar scans of the terrain. In this exemplary embodiment, first section of perspective view of the radar terrain 252 is within the current radar scans and the system utilizes these horizontal radar scans to compile first section of perspective view of the radar terrain 252.

In FIG. 7A, an illustration of a radar-based terrain image that is eight miles from aircraft that can be displayed on a flight display screen of the aircraft control center of FIG. 1 versus a database-based terrain is shown, according to an exemplary embodiment. In an exemplary embodiment, a third radar terrain versus database terrain screen 260 includes a third radar terrain image 261 and a third database terrain image 263. In an exemplary embodiment, third radar terrain image 261 is an altitude plot scan where airplane 10 is at a third position 262. In this exemplary embodiment, third database terrain image 263 is based on airplane 10 being at third position 262. In this exemplary embodiment, third radar terrain image 261 and third database terrain image 263 are based on airplane 10 being at an altitude of five thousand five hundred and forty-six (5,546) feet mean sea level. In this exemplary embodiment, altitude scale 196 indicates the altitude level on third radar terrain versus database terrain screen 260.

In an exemplary embodiment, third database terrain image 263 includes a fifth section of terrain database image 266 and a sixth section of terrain database image 264. In an exemplary embodiment, sixth section of terrain database image 264 indicates terrain tower location 188 is proximate to airplane 10 at third position 262.

Figure 7B:
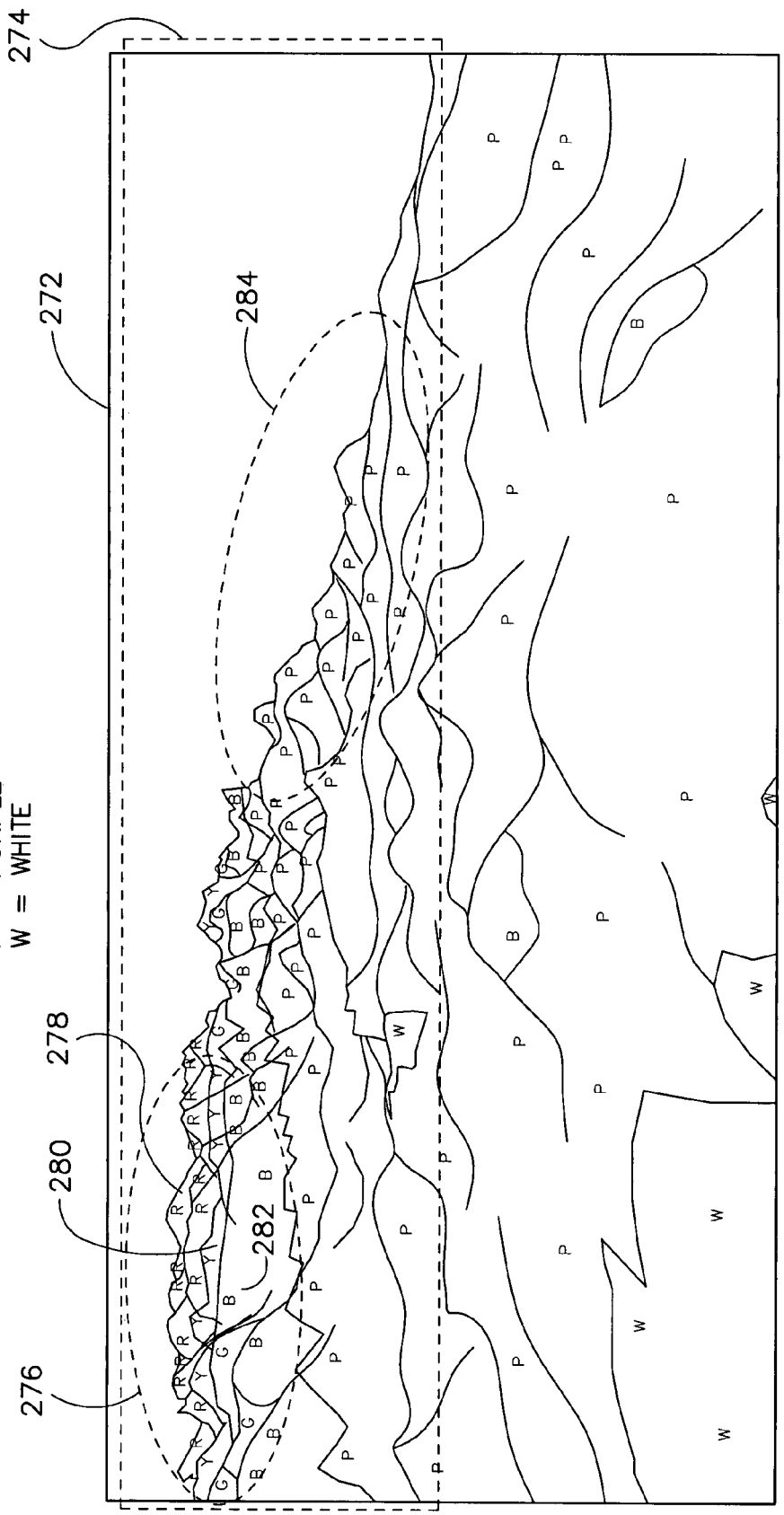
FIG. 7B is an illustration of a perspective view of the terrain that is eight miles from aircraft utilizing multiple horizontal radar scans averaged over several scans, according to an exemplary embodiment.

In FIG. 7B, an illustration of a perspective view of the terrain that is eight miles from aircraft utilizing multiple horizontal radar scans averaged over several scans is shown, according to an exemplary embodiment. In an exemplary embodiment, an eight mile away perspective view of the radar terrain 272 includes a top section of radar terrain image 274. In an exemplary embodiment, top section of radar terrain image 274 includes a first section of eight mile away perspective view 276 and a second section of eight mile away perspective view 284. In this exemplary embodiment, first section of eight mile away perspective view 276 includes a high terrain 278, a medium terrain 280 and a low terrain 282.

In FIG. 7C, an illustration of a perspective view of the terrain that is eight miles from aircraft in FIG. 7B utilizing a terrain database is shown, according to an exemplary embodiment. In an exemplary embodiment, an eight mile away perspective view of the database terrain 286 includes a first section of eight mile away perspective view of database terrain 287 and a second section of eight mile away perspective view of database terrain 288. Referring to FIGS. 7B and 7C, first section of eight mile away perspective view 276 has a significant correlation to first section of eight mile away perspective view of database terrain 287, according to an exemplary embodiment. In this exemplary embodiment, second section of eight mile away perspective view 284 has a significant correlation to second section of eight mile away perspective view of database terrain 288.

In FIG. 8, an exemplary embodiment of an egocentric perspective display of radar-based terrain integrated with an Altitude Direction Indicator ("ADI") is shown. The ADI is also known as an Altitude Director Indicator. In an exemplary embodiment, the broad while line in the center of the display indicates the zero (0) degree pitch line. The zero (0) degree pitch line is the dividing line between above airplane's 101 altitude and below airplane's 101 altitude. In an exemplary embodiment, the shorter white lines above and below the zero (0) pitch line indicate ten (10) degrees and twenty (20) degrees above and below the zero (0) pitch line.

In an exemplary embodiment, the radar-based terrain display is a composite of multiple radar scans. In an exemplary embodiment, radar system 102 can use horizontal and vertical scans to detect terrain and estimate the altitude of the terrain. In an exemplary embodiment, the radar scans horizontally up to plus or minus ninety (90) degrees from the track angle of airplane 10. The horizontal scan will have its visibility limited to three (3) to seven (7) degrees above and below the zero (0) degree pitch line depending upon the size of the antenna and the selected antenna steering algorithm, according to an exemplary embodiment.

In an exemplary embodiment, the system will store terrain elevation data until airplane 10 has passed over the terrain. This allows the system to display terrain which has fallen below the visibility of radar system 102, according to an exemplary embodiment. In an exemplary embodiment, radar system 102 scans vertically up to plus or minus fifteen (15) degrees above and below the zero (0) degree pitch line along the projected path of airplane 10. In level flight, the system will scan vertically directly in front of airplane 10, according to an exemplary embodiment. In an exemplary embodiment, when airplane 10 is in turning flight, radar system 102 will scan to the left and/or right to have visibility of terrain along the projected path of airplane 10. In another exemplary embodiment, radar system 102 can actively sense terrain that appears horizontally along the zero (0) degree pitch line and vertically along the center of the display. Terrain that is displayed in the lower left and right corners of the display will be terrain that was previously estimated by the system and maintained in memory until it is no longer required to render the display, according to an exemplary embodiment.

It should be noted that any angles known by those skilled in the art can be utilized and the angles disclosed herein are for illustration purposes and do not limit this disclosure.

In FIG. 8, an illustration of radar-based terrain in an egocentric view is shown, according to an exemplary embodiment. In an exemplary embodiment, an egocentric view of radar-estimated terrain screen 290 includes a first egocentric view section 292 and a second egocentric view section 294. In an exemplary embodiment, egocentric view of radar-estimated terrain screen 290 is based on a single scan of the terrain, a few scans of the terrain and/or a plurality of scans of the terrain. In another exemplary embodiment, egocentric view of radar-estimated terrain screen 290 is based on a composite of first egocentric view section 292 and second egocentric view section 294. In this exemplary embodiment, first egocentric view section 292 is the terrain at or above the altitude of airplane 10. In this exemplary embodiment second egocentric view section 294 is terrain below the current radar scan. In this exemplary embodiment, second egocentric view section 294 is based on previous radar scans of the terrain. In this exemplary embodiment, first egocentric view section 292 is within the current radar scans and the system utilizes these horizontal radar scans to compile first egocentric view section 292. In an exemplary embodiment, egocentric view of radar-estimated terrain screen 290 includes a high egocentric view terrain cell 296, a medium egocentric view terrain cell 298, a low egocentric view terrain cell 300 and a sky cell 302. In an exemplary embodiment, the terrain below airplane 10 can be depicted in brown. In another exemplary embodiment, the terrain at or above airplane 10 can be depicted in yellow or red. In exemplary embodiments, yellow can be utilized to indicate a caution situation and red can be utilized to indicate a warning situation.

In FIG. 9, an illustration of radar-based terrain in a wireframe view is shown, according to an exemplary embodiment. FIG. 9 provides an exemplary embodiment of a wireframe depiction of a radar-based terrain integrated with an ADI. The wireframe display format provides a transparent monochrome display that can be utilized with a heads-up display system, according to an exemplary embodiment. In an exemplary embodiment, a wireframe view of radar-estimated terrain screen 304 includes a first wireframe view section 308 and a second wireframe view section 306. In an exemplary embodiment, wireframe view of radar-estimated terrain screen 304 is based on a single scan of the terrain, a few scans of the terrain and/or a plurality of scans of the terrain. In another exemplary embodiment, wireframe view of radar-estimated terrain screen 304 is based on a composite of first wireframe view section 308 and second wireframe view section 306. In this exemplary embodiment, first wireframe view section 308 is the terrain at or above the altitude of airplane 10. In this exemplary embodiment, second wireframe view section 306 is terrain below the current radar scan. In this exemplary embodiment, second wireframe view section 306 is based on previous radar scans of the terrain. In this exemplary embodiment, first wireframe view section 308 is within the current radar scans and the system utilizes these horizontal radar scans to compile first wireframe view section 308. In an exemplary embodiment, wireframe view of radar-estimated terrain screen 304 includes a wireframe outline of the terrain 310.

In FIG. 10, an illustration of radar-based terrain depicted in a wireframe view overlaid on a synthetic vision system image from a database is shown, according to an exemplary embodiment. FIG. 10 provides an exemplary embodiment of a wireframe depiction of a radar-based terrain integrated with an ADI. The wireframe display format provides a transparent monochrome display that can be utilized with a heads-up display system, according to an exemplary embodiment. In an exemplary embodiment, a composite wireframe synthetic vision screen 312 includes a first section of composite wireframe synthetic vision screen 316 and a second section of composite wireframe synthetic vision screen 314. In an exemplary embodiment, composite wireframe synthetic vision screen 312 is based on a single scan of the terrain, a few scans of the terrain and/or a plurality of scans of the terrain. In another exemplary embodiment, composite wireframe synthetic vision screen 312 is based on a composite of first section of composite wireframe synthetic vision screen 316 and second section of composite wireframe synthetic vision screen 314. In this exemplary embodiment, first section of composite wireframe synthetic vision screen 316 is the terrain at or above the altitude of airplane 10. In this exemplary embodiment, second section of composite wireframe synthetic vision screen 314 is terrain below the current radar scan. In this exemplary embodiment, second section of composite wireframe synthetic vision screen 314 is based on previous radar scans of the terrain. In this exemplary embodiment, first section of composite wireframe synthetic vision screen 316 is within the current radar scans and the system utilizes these horizontal radar scans to compile first section of composite wireframe synthetic vision screen 316. In an exemplary embodiment, composite wireframe synthetic vision screen 312 includes a terrain database portion 320. Terrain database portion 320 is overlaid with a wireframe portion 318. In this exemplary embodiment, the aircrew can see any discrepancies between terrain database portion 320 and wireframe portion 318. This allows the aircrew and/or the system to determine whether there is a potential error source in the terrain database, radar system 102, or both. In FIG. 10, the radar data in a wireframe format is depicted on top of a synthetic vision system display generated from terrain database data. In this exemplary embodiment, the format provides a real-time validation of the synthetic vision system image. This allows the pilot and/or system to validate that database, the position sensors and the altitude sensors used to create the synthetic vision system image are all in alignment with the actual terrain. In an exemplary embodiment, the terrain below airplane 10 can be depicted in brown. In another exemplary embodiment, the terrain at or above airplane 10 can be depicted in yellow or red. In exemplary embodiments, yellow can be utilized to indicate a caution situation and red can be utilized to indicate a warning situation.

In an exemplary embodiment, flight display 20 may display a weather radar terrain estimation, a terrain database display, or both a weather radar terrain estimation and a terrain database display, all of which may be in color or black and white. The radar terrain estimation and the terrain database display are examples of an altitude plot scan. In an exemplary embodiment, radar terrain estimation and a terrain database display can be in the form of a perspective view instead of a top view. In an exemplary embodiment, the pilot may be able to choose his or her preferred display view. In addition to the views described above, composite views may be viewed on flight display 20 in an exemplary embodiment. In an exemplary embodiment, the pilot may be able to select a desired view or terrain data circuit 110 may automatically choose the best fit for the pilot in another predetermined condition.

Figure 11:
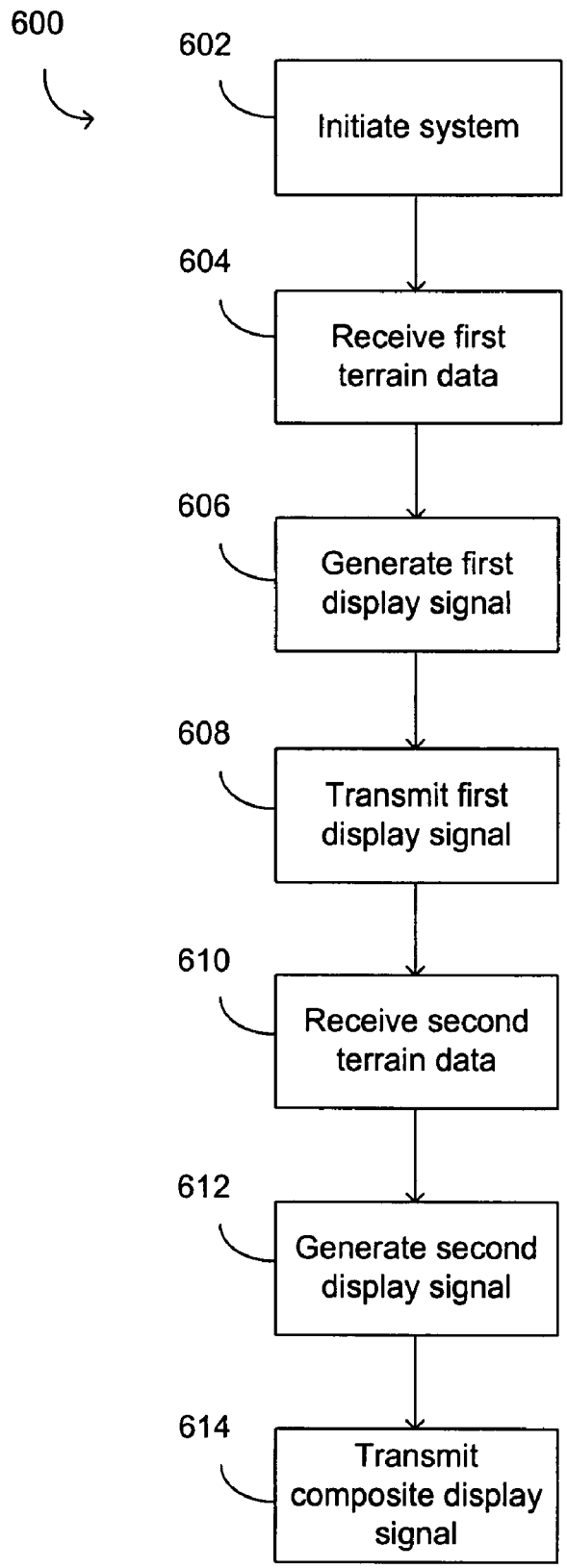
FIG. 11 is a flowchart of a method of displaying radar-estimated terrain in the aircraft control center of FIG. 1, according to one exemplary embodiment.

Referring to FIG. 11, a flow diagram of a process of displaying radar-estimated terrain 600 is shown, according to an exemplary embodiment. The first step is to initiate the system (step 602). The initialization of the system may be triggered by pilot request, the aircraft may automatically generate the initialization as part of a scheduled update of the flight display, or any combination thereof. After initialization, first terrain data is received by terrain data circuit 110 from radar system 102 (step 604). A first display signal representative of the terrain is generated by terrain data circuit 110 from first terrain data (step 606). Terrain data circuit 110 transmits the first display signal representative of the terrain to flight display 20 (step 608).

Figure 12:
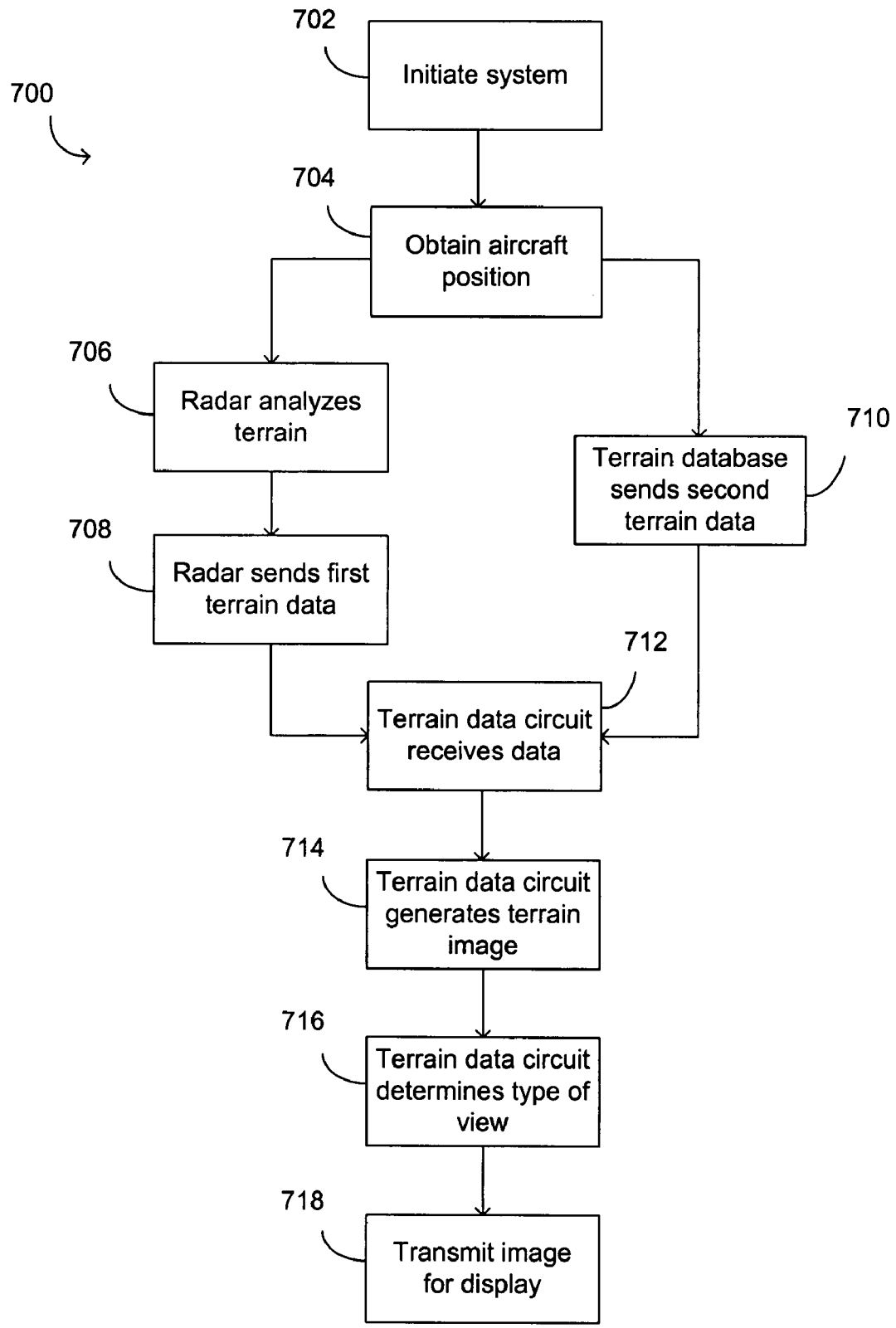
FIG. 12 is a flowchart of a method of displaying radar-estimated terrain in the aircraft control center of FIG. 1, according to another exemplary embodiment.

Referring to FIG. 12, a flow diagram of a process of displaying radar-estimated terrain 700 is shown, according to another exemplary embodiment. The first step is to initiate the system (step 702). The initialization of the system may be triggered by pilot request, the aircraft may automatically generate the initialization as part of a scheduled update of the flight displays, or any combination thereof. By initiating the system, radar system 102 can obtain the current position of the aircraft (step 704). Once the position of the aircraft is known, radar system 102 determines the terrain in range by transmitting a radio frequency wave (step 706). Radar system 102 transmits first terrain data to terrain data circuit 110 and terrain data circuit 110 analyzes first terrain data (step 708). Concurrently, terrain database 101 will obtain data relevant to the range and transmit second terrain data to terrain data circuit 110 (step 710). Terrain data circuit 110 will receive first terrain data and second terrain data (step 712). Terrain data circuit 110 can utilize first terrain data, second terrain data, and/or any combination thereof. In an exemplary embodiment, terrain data circuit 110 can utilize a weighted average, a time-weighted approach, an exponentially weighted moving average, an autoregressive moving average ("ARMA"), and/or any other mathematical modeling. Terrain data circuit 110 generates a terrain image (step 714). Once a terrain image is established, terrain data circuit 110 determines the type of view to use (step 716). In exemplary embodiments, the views may be a wire frame view, a synthetic vision view, or a composite of a wire frame view and a synthetic vision view. Terrain data circuit 110 transmits the image to flight display 20 (step 718).

Figure 13:
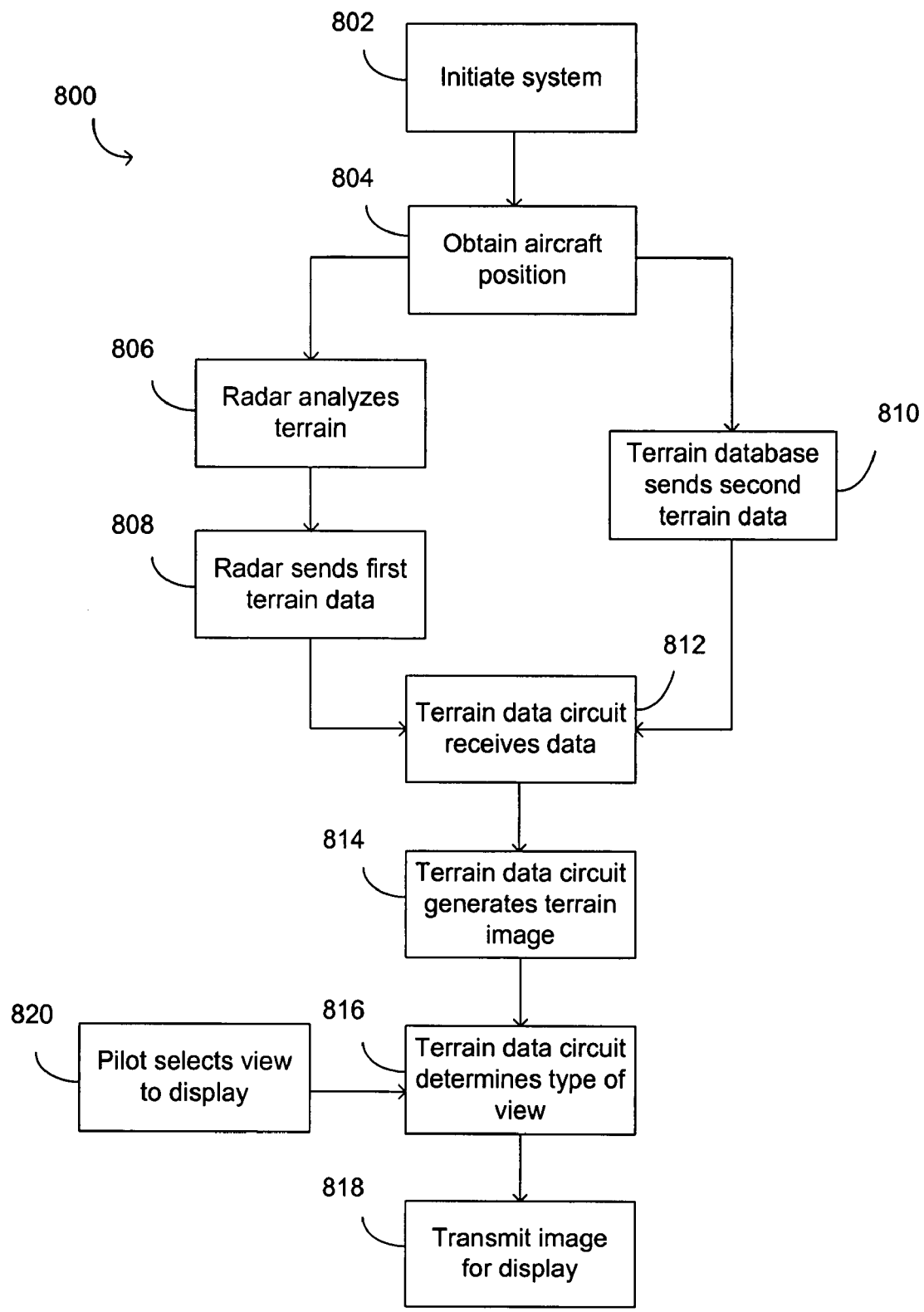
FIG. 13 is a flowchart of a method of displaying radar-estimated terrain in the aircraft control center of FIG. 1, according to yet another exemplary embodiment.

Referring to FIG. 13, a flow diagram of a process of displaying radar-estimated terrain 800 is shown, according to an exemplary embodiment. The first step is to initiate the system (step 802). The initialization of the system may be triggered by pilot request, the aircraft may automatically generate the initialization as part of a scheduled update of the flight displays or any combination thereof. By initiating the system, radar system 102 can obtain the current position of the aircraft (step 804). Once the position of the aircraft is known, radar system 102 determines the terrain in range by transmitting radio frequency waves (step 806). Radar system 102 transmits first terrain data to terrain data circuit 110 and terrain data circuit 110 analyzes first terrain data 150 (step 808). Concurrently, terrain database 101 will obtain data relevant to the range and transmit second terrain data to terrain data circuit 110 (step 810). Terrain data circuit 110 will receive first terrain data and second terrain data (step 812). Terrain data circuit 110 can utilize first terrain data, second terrain data, and/or any combination thereof. In an exemplary embodiment, terrain data circuit 110 can utilize a weighted average, a time-weighted approach, an exponentially weighted moving average, an autoregressive moving average ("ARMA"), and/or any other mathematical modeling. Terrain data circuit 110 generates a terrain image (step 814). Once a terrain image is established, terrain data circuit 110 determines the type of view to use (step 816). In exemplary embodiments, the views may be a wire frame view, a synthetic vision view, or a composite of a wire frame view and a synthetic vision view. Terrain data circuit 110 transmits the image to flight display 20 (step 818). However, if the pilot so desires, he or she may select his or her own type of view to display on flight display 20 (step 820).

In an exemplary embodiment, terrain data circuit 110 can include at least one of a terrain display logic, a premature descent alerting logic, a ground proximity alerting logic and a forward-looking terrain alerting logic. In an exemplary embodiment, radar system 102 looks ahead of the aircraft along the projected path of the aircraft. In an exemplary embodiment, radar system 102 transmits look ahead data to forward-looking terrain alerting logic. In an exemplary embodiment, terrain data circuit 110 computes range, elevation, and azimuth to terrain cells of interest along the projected path. In an exemplary embodiment, terrain data circuit 110 stores terrain data for the terrain cells that pass below the radar beam and which may eventually pass below the aircraft.

In an exemplary embodiment, this terrain data may be stored in temporary memory and erased once the aircraft has passed over the terrain cell. In another exemplary embodiment, this terrain data may be stored in terrain data circuit database. In this exemplary embodiment, this terrain data can be downloaded into a central off-board computer along with other terrain data from a plurality of aircrafts. This central off-board computer can upload a composite of terrain data obtained from the plurality of aircrafts to one of the aircraft, a few aircrafts, a plurality of aircrafts or all of the aircrafts. In an exemplary embodiment, terrain data circuit 110 can be configured to generate a discrepancy report comparing the terrain data uploaded from the central off-board computer to terrain data stored in terrain data circuit database or real-time terrain data generated by forward-looking terrain alerting logic.

In an exemplary embodiment, a terrain cell can be located at or above the aircraft operating altitude. In an exemplary embodiment, terrain data circuit 110 utilizes forward-looking terrain alerting logic to determine when the aircraft must initiate a climb to clear terrain cell. In another exemplary embodiment, terrain cell can be located below the aircraft operating altitude. Terrain data circuit 110 monitors the inertial flight path of the aircraft and uses a downward-looking radio altimeter to ensure that clearance parameters are maintained as the aircraft passes over terrain cell. In an exemplary embodiment, forward-looking terrain alerting logic is in communication with downward-looking radio altimeter to compare terrain data related to terrain cell generated by both forward-looking terrain alerting logic and downward-looking radio altimeter. This comparison is utilized to verify that the aircraft has passed over terrain cell initially generated by forward-looking terrain alerting logic. It should be noted that one terrain cell, a few terrain cells or a plurality of terrain cells can make up a terrain profile.

In an exemplary embodiment, forward-looking terrain alerting logic is in communication with radar system 102, downward-looking radar system, a global positioning system, an air data system, and an inertial reference system. In an exemplary embodiment, radar system 102 is a forward-looking radar system (i.e., a weather radar system). In an exemplary embodiment, downward-looking radar system can be a radio altimeter ("RA"). In an exemplary embodiment, air data system can be an air data computer ("ADC"). In an exemplary embodiment, inertial reference system can be an altitude heading reference system ("AHRS"). In an exemplary embodiment, the inertial altitude may be slaved to the barometric pressure altitude. In an exemplary embodiment, global positioning system can be combined with inertial reference system to enhance data calculations and support the display functionality. In an exemplary embodiment, terrain data circuit 110 may be configured to integrate the inertial and global positioning system data for computing alerts.

In an exemplary embodiment, terrain data circuit 110 may operate asynchronously; In this mode of operation, terrain data circuit 110 can be configured to utilize only terrain display logic. The terrain display provides strategic information so that the flight crew is aware of the terrain surrounding the aircraft. In other exemplary embodiments, terrain data circuit 110 can include at least one or all of premature descent alerting logic, ground proximity alerting logic and forward-looking terrain alerting logic.

In an exemplary embodiment, premature descent alerting logic can issue an alert during final approach when the aircraft is below a nominal three degrees (3°) approach angle to the runway threshold. In another exemplary embodiment, premature descent alerting logic can issue an alert during intermediate approach based on predetermined parameters. It should be noted that the selection of three degree (3°) could be any number utilized by one skilled in the art.

In an exemplary embodiment, ground proximity alert logic can issue an alert when the aircraft altitude and sink rate fall within the alerting envelopes specified by the GPWS minimum operational performance standards ("MOPS").

In an exemplary embodiment, forward-looking terrain alerting logic can issue an alert when the projected path of the aircraft will break through the clearance altitudes defined in TSO-C151b. The TSO-C151b describes operating conditions that must result in a forward-looking alert. An alert must be issued when the aircraft is in level flight and below the terrain. This is known as the imminent terrain impact ("ITI") condition. An alert must be issued when a reduced required terrain clearance ("RTC") occurs. A reduced required terrain clearance occurs when either the aircraft is in level flight above the terrain but below the required clearance altitude or the aircraft is in descending flight above the terrain and descends below the clearance altitude. The TSO-C151b requires cautions and warnings alerts to be issued. In the imminent terrain impact condition, a caution and/or warning alert is issued when the flight crew can initiate a ¼ g vertical maneuver and can climb to the required clearance altitude above the terrain. In the descending flight, a caution and/or warning alert is issued when the flight crew can initiate a ¼ g vertical maneuver to level off at or above the required clearance altitude above the terrain.

In an exemplary embodiment, a caution signal and/or warning signal can be issued when airplane 10 reaches predetermined operational or system characteristics. In an exemplary embodiment, a caution signal would be issued when airplane 10 reaches a caution distance from terrain cell. In an exemplary embodiment, a warning signal would be issued when airplane 10 reaches a warning distance from terrain cell. In an exemplary embodiment, warning distance is greater than, or equal to, a minimum climb distance.

In an exemplary embodiment, minimum climb distance is the minimum distance required for airplane 10 to initiate a maneuver and be able to traverse terrain cell. Minimum climb distance is the distance away from terrain cell that allows airplane 10 to depart from level flight path and traverse the obstacle source. In an exemplary embodiment, the minimum climb distance is the sum of two components. The first component is the distance covered by the aircraft during a ¼ g vertical maneuver to achieve a specified climb angle. The second component is the distance covered by the aircraft during the climb at the specified angle. In an exemplary embodiment, the specified climb angle is six degrees (6°) as defined in the Technical Standard Order ("TSO") for terrain awareness warning system. In an exemplary embodiment, the specified climb angle is computed in real time and is dependent on specific characteristics of airplane 10 (i.e., size, weight, engine size, etc.).

TSO-C151b defines two types of alerts that must be issued to the flight crew to inform the crew that a potential conflict with terrain exists. Warnings indicate that a terrain conflict is imminent and that the crew must take immediate action to avoid an accident. Cautions indicate that a terrain conflict may be imminent and that the crew should prepare to take action to avoid an accident. The combination of warnings and cautions must occur in such a way as to ensure that the crew has sufficient time to react prior to the aircraft reaching minimum climb distance. In an exemplary embodiment, the warning alert can be issued before airplane 10 reaches minimum climb distance. In another exemplary embodiment, caution distance can be up to twice the size of warning distance. In an exemplary embodiment, warning distance and caution distance can be tuned through lab simulations to minimize nuisance alerts.

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the terrain data circuit 110 as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application have been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

Although the description contains many specificities, these specificities are utilized to illustrate some of the preferred embodiments of this application and should not be construed as limiting the scope of the application. The scope of this application should be determined by the claims, their legal equivalents, and the fact that it fully encompasses other embodiments which may become apparent to those skilled in the art.

What is claimed is:

1. In an aircraft, including a display for receiving a display signal representative of terrain, a terrain data circuit comprising:
    an interface in communication with a radar system, a terrain database, and the display;
    a display control circuit configured to process a first terrain data received from the radar system and to process a second terrain data received from the terrain database, the display control circuit further configured to generate a composite terrain image based on the first terrain data and the second terrain data; and
    wherein the terrain data circuit is configured to provide the display signal representative of terrain based on the composite terrain image.

2. The terrain data circuit of claim 1, wherein the composite terrain image comprises a first terrain image superimposed onto a second terrain image.

3. The terrain data circuit of claim 2, wherein the terrain database is in a terrain awareness and warning system.

4. The terrain data circuit of claim 2, wherein the terrain data circuit generates a discrepancy report based on comparing the first terrain image to the second terrain image.

5. The terrain data circuit of claim 1, wherein the composite terrain image is a wire frame view.

6. The terrain data circuit of claim 1, wherein the composite terrain image is a synthetic vision system view.

7. The terrain data circuit of claim 1, wherein composite terrain image is a composite of a wire frame view and a synthetic vision system view.

8. The terrain data circuit of claim 1, wherein the terrain data circuit further comprises a graphic processing engine.

9. A method of displaying a terrain image on a display comprising:
    receiving a first terrain data from a radar system;
    providing a first display signal representative of terrain based on the first terrain data;
    receiving a second terrain data from a terrain database;
    providing a second display signal representative of terrain based on the second terrain data;
    generating a composite terrain image based on the first display signal and the second display signal;
    storing in a computer-readable medium the composite terrain image; and
    displaying the composite terrain image.

10. The method of claim 9, further comprising generating a discrepancy report based on a comparison of the first display signal and the second display signal.

11. The method of claim 9, further comprising superimposing a first terrain image onto a second terrain image to generate the composite terrain image.

12. The method of claim 9, further comprising generating a discrepancy field based on a comparison of the first terrain data and the second terrain data, and displaying the discrepancy field on the composite terrain image.

13. In an aircraft, including a display for receiving a display signal representative of terrain, a terrain data circuit comprising:
    an interface means for coupling to a radar system, a terrain database, and the display;
    a means for controlling a display circuit configured to control the display and configured to generate a composite terrain image based on a first terrain data and a second terrain data;
    a means for processing the first terrain data received from the radar system and to process the second terrain data received from the terrain database; and
    wherein the terrain data circuit is configured to provide the composite terrain image to the display.

14. The terrain data circuit of claim 13, wherein the composite terrain image comprises a first terrain image superimposed onto a second terrain image.

15. The terrain data circuit of claim 14, wherein the terrain database is in a terrain awareness warning system.

16. The terrain data circuit of claim 14, wherein the terrain data circuit generates a discrepancy report based on comparing the first terrain image to the second terrain image.

17. The terrain data circuit of claim 13, wherein the composite terrain image is a wire frame view.

18. The terrain data circuit of claim 13, wherein the composite terrain image is a synthetic vision system view.

19. The terrain data circuit of claim 13, wherein the composite terrain image is a composite of a wire frame view and a synthetic vision system view.

20. The terrain data circuit of claim 13, wherein the terrain data circuit further comprises a means for graphic processing.

* * * * *